(12) United States Patent
Pratt et al.

(10) Patent No.: US 9,322,922 B2
(45) Date of Patent: Apr. 26, 2016

(54) DETERMINING POSITION OF A GNSS RECEIVER USING FRACTIONAL SIGNALLING EVENT PERIOD TIMES

(75) Inventors: Anthony Richard Pratt, Northamptonshire (GB); Murray Robert Jarvis, Stapleford (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 706 days.

(21) Appl. No.: 13/344,297

(22) Filed: Jan. 5, 2012

(65) Prior Publication Data

US 2013/0002479 A1     Jan. 3, 2013

(30) Foreign Application Priority Data

Jan. 5, 2011   (GB) .................................. 1100114.6

(51) Int. Cl.
    *G01S 19/28*     (2010.01)
    *G01S 19/40*     (2010.01)
    *G01S 19/43*     (2010.01)

(52) U.S. Cl.
    CPC .................. *G01S 19/28* (2013.01); *G01S 19/40* (2013.01); *G01S 19/43* (2013.01)

(58) Field of Classification Search
    USPC ............. 342/357.23, 357.24, 357.25, 357.26
    See application file for complete search history.

(56) References Cited

U.S. PATENT DOCUMENTS

| | | | |
|---|---|---|---|
| 4,928,107 A | 5/1990 | Kuroda | |
| 5,323,163 A | 6/1994 | Maki | |
| 5,552,794 A | 9/1996 | Colley | |
| 6,102,338 A | 8/2000 | Yoshikawa | |
| 6,191,731 B1 | 2/2001 | McBurney et al. | |

(Continued)

FOREIGN PATENT DOCUMENTS

| | | |
|---|---|---|
| EP | 0353849 | 2/1990 |
| EP | 0451607 | 10/1991 |

(Continued)

OTHER PUBLICATIONS

Peterson, et al., "GPS Receiver Structures for the Urban Canyon," pp. 1323-1332, Proceedings of the 8th International Technical Meeting of the Satellite Division of The Institute of Navigation (ION GPS 1995), Sep. 12-15, 1995, Palm Springs, CA.

(Continued)

*Primary Examiner* — Cassie Galt
(74) *Attorney, Agent, or Firm* — The Marbury Law Group, PLLC

(57) ABSTRACT

Apparatus for calculating the position of a receiver in dependence on the time it takes signalling events to travel from a plurality of satellites to the receiver, obtains an indication of a transit time for a signalling event to travel from each satellite to the receiver, and forms an indication of an expected transit time for a signalling event to travel from the satellite to the receiver. The obtained indication of the transit time and the indication of the expected transit time for each non-reference satellite are compared with the obtained indication of the transit time and the indication of the expected transit time for the reference satellite to form residuals that are representative of a combined error in those indications of expected transit time; and the position of the receiver is calculate without calculating the integer ambiguities in the obtained transit times, in dependence on the residuals.

46 Claims, 16 Drawing Sheets

(56) References Cited

U.S. PATENT DOCUMENTS

| | | | |
|---|---|---|---|
| 6,329,945 | B1 | 12/2001 | Hynes |
| 6,392,593 | B1 | 5/2002 | Pemble |
| 6,417,801 | B1 | 7/2002 | Van Diggelen |
| 6,650,288 | B1 | 11/2003 | Pitt |
| 6,720,915 | B2 | 4/2004 | Sheynblat |
| 6,725,158 | B1 | 4/2004 | Sullivan |
| 6,727,850 | B2 | 4/2004 | Park |
| 6,734,821 | B2 * | 5/2004 | van Diggelen ............ 342/357.62 |
| 6,771,215 | B2 * | 8/2004 | Akopian et al. ......... 342/357.63 |
| 6,917,330 | B2 | 7/2005 | Ohmura |
| 7,064,709 | B1 | 6/2006 | Weisenburger et al. |
| 7,095,368 | B1 | 8/2006 | vanDiggelen |
| 7,142,155 | B2 | 11/2006 | Iwami |
| 7,152,015 | B2 | 12/2006 | Manzen |
| 7,295,155 | B2 | 11/2007 | Wakamatsu |
| 7,522,098 | B2 * | 4/2009 | van Diggelen ............ 342/357.25 |
| 7,847,728 | B2 | 12/2010 | Thomson et al. |
| 7,961,142 | B2 | 6/2011 | Nagahara |
| 2003/0016172 | A1 | 1/2003 | Natsume |
| 2003/0197639 | A1 | 10/2003 | Sheynblat |
| 2003/0224802 | A1 | 12/2003 | Nir |
| 2004/0041729 | A1 | 3/2004 | Rowitch |
| 2004/0104840 | A1 | 6/2004 | Awata |
| 2004/0130485 | A1 * | 7/2004 | Rapoport et al. ......... 342/357.03 |
| 2004/0145518 | A1 | 7/2004 | Toda |
| 2005/0055160 | A1 | 3/2005 | King |
| 2005/0101248 | A1 | 5/2005 | Vollath |
| 2006/0055596 | A1 * | 3/2006 | Bryant et al. ............ 342/357.06 |
| 2007/0216572 | A1 | 9/2007 | Schnabel |
| 2007/0241958 | A1 | 10/2007 | Nicholson |
| 2008/0048910 | A1 | 2/2008 | Wang |
| 2008/0074317 | A1 | 3/2008 | Harper |
| 2008/0291979 | A1 | 11/2008 | Normark |
| 2009/0040104 | A1 | 2/2009 | Mitsunaga |
| 2009/0195446 | A1 | 8/2009 | Liao |
| 2009/0195451 | A1 | 8/2009 | Henkel |
| 2009/0322607 | A1 | 12/2009 | Mitsunaga |
| 2010/0138147 | A1 | 6/2010 | T'Siobbel |
| 2010/0207810 | A1 | 8/2010 | Terashima |
| 2010/0302099 | A1 | 12/2010 | Grossnickle |
| 2011/0037646 | A1 | 2/2011 | Tajima |
| 2011/0068977 | A1 | 3/2011 | Thomson |
| 2011/0080318 | A1 | 4/2011 | Alizadeh-Shabdiz |
| 2011/0248887 | A1 | 10/2011 | Whelan et al. |
| 2012/0182181 | A1 | 7/2012 | Dai |

FOREIGN PATENT DOCUMENTS

| | | |
|---|---|---|
| WO | 0058748 | 10/2000 |
| WO | 2005081010 | 9/2005 |
| WO | WO 2008/040896 A2 | 4/2008 |
| WO | WO 2011/127450 A2 | 10/2011 |

OTHER PUBLICATIONS

Lannelongue, et al., "Fast Acquisition Techniques for G.P.S. Receivers," pp. 261-269, Proceedings of the 54th Annual Meeting of The Institute of Navigation, Jun. 1-3, 1998, Denver, CO.

Van Diggelen, "A-GPS: Assisted GPS, GNSS and SBAS 72," Chapter 4, Coarse-Time Navigation: Instant GPS, Artech House, Boston, 2009.

Copending U.S. Appl. No. 13/344,098, filed Jan. 5, 2012.
Copending U.S. Appl. No. 13/344,410, filed Jan. 5, 2012.
Copending U.S. Appl. No. 13/344,494, filed Jan. 5, 2012.
Copending U.S. Appl. No. 13/344,524, filed Jan. 5, 2012.
International Preliminary Report on Patentability for International Appln. No. PCT/EP2012/050137, dated Jul. 10, 2013.
International Search Report and Written Opinion of the International Searching Authority issued in PCT/EP2012/050136 dated May 25, 2012.
International Search Report issued in PCT/EP2012/050134 dated May 11, 2012.
UK Search Report dated May 14, 2012, in corresponding UK Application GB1105217.2.
UK Search Report dated May 16, 2012, in corresponding UK application GB1100115.3.
UK Search Report dated May 18, 2012, in corresponding UK application GB1100117.9.
UK Search Report dated May 22, 2012, in corresponding UK Application GB 1100116.1.
Written Opinion for International Application No. PCT/EP2012/050137 dated Feb. 28, 2013.
GB Search and Examination Report issued in related GB Application No. GB1419325.4, dated Nov. 21, 2014.
Office Action for U.S. Appl. No. 13/344,494, dated Dec. 24, 2014.
Notice of Allowance for U.S. Appl. No. 13/344,098, dated Dec. 31, 2014.
Office Action dated Mar. 2, 2015, U.S. Appl. No. 13/344,410.
UK Examination Report issued in UK Application No. GB1419325.4, dated Feb. 3, 2015.
European Search Report—EP12150210—Search Authority—Hague—Oct. 5, 2012.
UK Search Report dated May 14, 2012, in corresponding UK application.
UK Search Report dated May 16, 2012, in corresponding UK application.
UK Search Report dated May 18, 2012, in corresponding UK application.
UK Search Report dated May 22, 2012, in corresponding GB application.
Notice of Allowance mailed Aug. 7, 2015 in U.S. Appl. No. 13/344,494.
Office Action mailed Aug. 4, 2015 in U.S. Appl. No. 13/344,410.

* cited by examiner

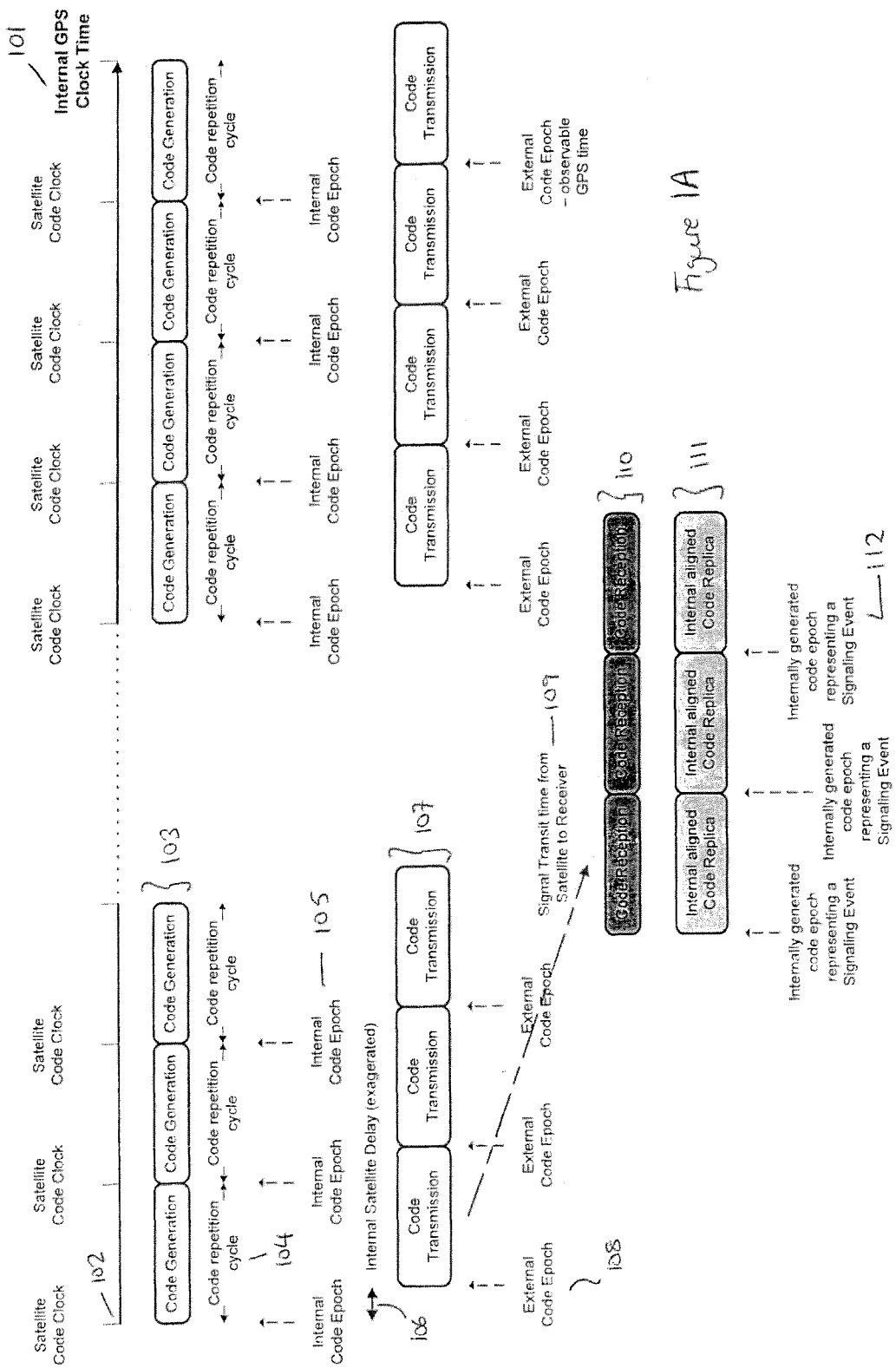

DETERMINING POSITION OF A GNSS RECEIVER USING FRACTIONAL SIGNALLING EVENT PERIOD TIMES

BACKGROUND OF THE INVENTION

The invention relates to a method and apparatus for determining the position of a Global Navigation Satellite System (GNSS) receiver, and in particular to determining the position of the receiver when it has not been possible to decode the part of the GNSS navigation message containing the transmission time of the signal.

The Global Positioning System (GPS) is a navigation system in which a receiver determines its position by precisely measuring the arrival time of signalling events received from multiple satellites. Each satellite transmits a navigation message containing the precise time when the message was transmitted and ephemeris information. This includes details about the satellite's orbit and corrections for the satellite's own clock, in comparison with a universal or absolute time such as GPS time. The ephemeris and clock correction parameters may collectively be known as ephemeris information.

GPS signals are formed of a navigation message binary phase shift modulated (BPSK) onto a direct sequence spread spectrum signal. The spread spectrum signal comprises a unique pseudo-noise (PN) code that identifies the satellite. For civil application GPS signals transmitted using the L1 frequency, this code is known as the C/A code. The C/A code has a sequence length of 1023 chips and it is spread with a 1.023 MHz chipping rate. The code sequence therefore repeats every millisecond. The code sequence has an identified start instant when the two code generators in the satellite just transition to the all state. This instant is known as the code epoch. After various transport delays in the satellite, the code epoch is broadcast. This event is called a signalling event and can be recognised, in suitably adapted receivers, through a process of aligning a replica code with the code received from each satellite.

The navigation message has a lower data rate of 50 bits per second and its start is synchronised with the start of the C/A code sequence. Each bit of the navigation message lasts for 20 milliseconds and thus incorporates 20 repetitions of the C/A code. The navigation message is constructed from a 1500-bit frame consisting of five 300-bit sub-frames. Each sub-frame lasts for 6 seconds. The satellite transmits the navigation message and C/A code using a carrier frequency that is an integer multiple of 10.23 MHz (for the L1 carrier, the multiple is 154).

In addition to the time and ephemeris information, the data message also contains the satellite constellation almanac, parameters representing the ionospheric and tropospheric delay, health parameters and other information used by some receivers. There are 25 different frames of data broadcast from each satellite. Each frame contains identical information (apart from time) in sub-frames 1-3 inclusive but cycles through a pre-assigned sequence of data in sub-frames 4 and 5, which contain almanac and other information.

As mentioned above, a GPS receiver may determine the time-of-arrival of a signalling event through a process of aligning a replica code with the code received from each satellite. The receiver may also use the Time of Week (TOW) information contained in the navigation message to determine the time when the signalling event was transmitted. From this, the receiver can determine the transit time for the signalling event (from which it can determine the distance between it and the satellite), together with the position of the satellite at the time when the signalling event was transmitted (using the ephemeris information). The receiver can then calculate its own position. Theoretically, the position of the GPS receiver can be determined using signals from three satellites, providing the receiver has a precise time or knowledge of part of the positions, such as altitude. However, in practice GPS receivers use signals from four or more satellites to determine an accurate three-dimensional location solution because an bias between the receiver clock and GPS time introduces an additional unknown into the calculation.

If the satellite signal reception is poor (commonly known as weak signal conditions), or if the receiver only receives a short burst of the signal, the receiver may not be able to decode the TOW information. Without this information, the GPS receiver may be unable to determine the distance between it and the satellite with sufficient accuracy because the receiver will not know the time when the signalling event was transmitted. Under weak signal conditions or briefly glimpsed signals, the receiver may also be unable to recognise the start of a sub-frame since it may not be able to decode the TLM.

A receiver that has been unable to decode the TOW information in the navigation message may nonetheless be able to deduce some timing information even under weak signal conditions or from briefly-glimpsed signals. For example, the receiver may be able to determine a time shift between the satellite signal's spreading (PN) code and a locally generated version of the same, e.g. by correlating the received signal with a locally generated replica of the PN code or by using an equivalent signal processing technique. This time shift represents at least part of the transit time for the satellite signal. However, since both the PN code in the signal and the locally generated replica code are of finite length in space (known as the code wavelength), the correlation operation can only identify a part of the total time shift. This part of the total time shift represents the fractional part of the signal transit time between satellite and user after an integer number of code repetition intervals have been subtracted. This leaves unknown the integer number of code repetition intervals the signal took to travel between the satellite and the receiver.

In order to compute its position accurately, the receiver also needs to be able to resolve discrepancies between the various clocks in the system. GPS time is defined by an ensemble of clocks generally located at the US Naval Observatory in Washington. Each satellite has its own operating clock (usually one of three on board the space vehicle), which is approximately synchronised with GPS time. In practice, however, the satellite clock is bias from GPS time by a small amount. The receiver clock is also likely to be bias from GPS time, at least prior to an initial location solution. Uncorrected, these clock biases introduce significant errors into the location calculation.

"GPS Receiver Structures for the Urban Canyon" by Peterson et al. presents a method for computing the position of a GPS receiver in a deep urban canyon, in which the receiver may obtain brief glimpses of satellites but rarely sees three or more satellites simultaneously. The method addresses the problem of having an unknown common system time by expanding the location calculation to encompass an additional satellite range measurement and an additional unknown parameter termed "coarse time". The Peterson paper thus proposes a solution in which signals from five satellites are required for a 3D-location solution.

"Fast Acquisition Techniques for GPS Receivers" by Lannelongue et al. also presents a method for computing the position of a GPS receiver in which the common system time is unknown.

The integer millisecond ambiguity is also addressed by U.S. Pat. No. 6,417,801, which describes a way of estimating the integer milliseconds by calculating the geometric pseudo-range of the receiver to the satellite. The geometric pseudo-range is calculated using an estimated position of the GPS receiver and the position of the satellite at an estimated GPS time. U.S. Pat. No. 6,417,801 estimates the number of integer milliseconds that the signal took to travel between the satellite and the GPS receiver from the estimated pseudo-range and adds this to a measured, sub-millisecond pseudo-range to obtain a 'full' pseudo-range. The full pseudo-ranges from five satellites are then used to calculate the location of the GPS receiver. This technique is also described in "A-GPS: Assisted GPS, GNSS and SBAS 72" by Frank Van Diggelen (see chapter 4).

Mathematical techniques may be used to change the unknowns output by the location calculation. For example, U.S. Pat. No. 7,064,709 explains that calculating the integer number of milliseconds using estimated pseudo-ranges is not always sufficiently accurate and instead proposes a method whereby a common transit delay, represented as an number of integer milliseconds, is inserted as one of the unknowns to be determined as part of the location calculation. U.S. Pat. No. 7,064,709 also proposes that differences may be used to create four equations and four unknowns from the five equations using satellite measurements.

U.S. Pat. No. 6,191,731 also describes making five range measurements to five satellites and solving the five resulting equations by weighting and subtracting one from the four others in order to eliminate a one of the unknown terms. This is a purely mathematical procedure which, in this example, cancels the user clock error term from the five linearized position equations.

These techniques are similar to the differencing methods used in some land survey implementations in which GPS time is known. Signals from two different satellites are differenced at one receiver and that difference is then subtracted from a similar difference calculated at another receiver. This double-difference technique allows unknowns such as the satellite clock error and the receiver clock error to be eliminated from the calculation. These techniques are generally operative only within a zone where the location solution converges with a low error.

There is a need for an improved method of calculating the position of a GPS receiver when the time at which a GPS signal was transmitted by a satellite is unknown.

SUMMARY OF THE INVENTION

According to a first embodiment of the invention, there is provided an apparatus for calculating the position of a receiver in dependence on the time it takes signalling events to travel from a plurality of satellites to the receiver, the apparatus being arranged to, in respect of each satellite: obtain an indication of a transit time for a signalling event to travel from the satellite to the receiver, the indication of the transit time incorporating an integer ambiguity; and form an indication of an expected transit time for a signalling event to travel from the satellite to the receiver; the apparatus being further arranged to: designate one of the plurality of satellites as a reference satellite; compare the obtained indication of the transit time and the indication of the expected transit time for each non-reference satellite with the obtained indication of the transit time and the indication of the expected transit time for the reference satellite to form residuals that are representative of a combined error in those indications of expected transit time; and calculate the position of the receiver, without calculating the integer ambiguities in the obtained transit times, in dependence on the residuals.

The apparatus may be arranged to use a time-of-arrival of a signalling event at the receiver as the obtained indication of a transit time for that signalling event. The apparatus may be arranged to use a fractional part of a time-of-arrival of a signalling event at the receiver as the obtained indication of a transit time for that signalling event.

The apparatus may be arranged to compare the obtained indications of the transit times for the reference satellite and each non-reference satellite by measuring a time difference between an arrival at the receiver of a signalling event transmitted by the reference satellite and an arrival at the receiver of a signalling event transmitted by the non-reference satellite.

The apparatus may be arranged to form the indications of the expected transit times by estimating, for each satellite, a distance between that satellite and the GPS receiver.

The apparatus may be arranged to form the indications of the expected transit times by, in respect of each satellite: estimating a position of the receiver; estimating a position of the satellite in dependence on an estimated absolute time and ephemeris information; and computing the indications of the expected transit times in dependence on the estimated positions of the receiver and the satellite.

The apparatus may be arranged to form adjusted transit times by removing from each obtained indication of the transit time for a signalling event a clock bias associated with the satellite that transmitted that signalling event.

The apparatus may be arranged to represent both the adjusted transit times and the indications of the expected transit times in units of one of distance or time, the apparatus being arranged to form the residuals by, for each non-reference satellite: subtracting the representation of the expected transit time for the non-reference satellite from the representation of the adjusted transit time for the non-reference satellite; subtracting the representation of the expected transit time for the reference satellite from the representation of the adjusted transit time for the reference satellite; calculating the difference between the result of the subtraction in respect of the non-reference satellite and the result of the subtraction in respect of the reference satellite.

The apparatus may be arranged to form each residual by calculating:

$$(\tilde{\tau}_j - \hat{d}_j/c) - (\tilde{\tau}_0 - \hat{d}_0/c)$$

in which:
$\tilde{\tau}_j$ is a fractional part of the time-of-arrival of the signalling event transmitted by the non-reference satellite minus a clock bias associated with the non-reference satellite;
$\tilde{\tau}_0$ is a fractional part of the time-of-arrival of the signalling event transmitted by the reference satellite minus a clock bias associated with the reference satellite;
$\hat{d}_j$ is an estimated distance between the receiver and the non-reference satellite;
$\hat{d}_0$ is an estimated distance between the receiver and the reference satellite; and c is the speed of light.

The apparatus may be arranged to perform a modulo operation on each residual to identify a fractional part of that residual, the apparatus being arranged to calculate the position of the receiver in dependence on those fractional parts.

Each of the plurality of satellites may be arranged to transmit signalling events at time instants separated by a repetition interval $t_C$, and the apparatus may be arranged to reframe the residuals in the range $\pm t_C/2$ by identifying a sub-$t_C$ part of each residual and, if that result is greater than $t_C/2$, subtracting $t_C$ from that sub-millisecond part.

The apparatus may be arranged to reframe the residuals in the range of −0.5 ms to 0.5 ms by identifying a sub-millisecond part of each residual and, if that result is greater than half a millisecond, subtracting a millisecond from that sub-millisecond part.

The apparatus may be arranged to represent the reframed residuals in units of distance and calculate the position of the receiver in dependence on those distances.

The apparatus may be arranged to form the indication of an expected transit time for a non-reference satellite by predicting a time-of-arrival at the receiver of a signalling event transmitted by that non-reference satellite.

The apparatus may be arranged to form the prediction in dependence on a time-of-arrival at the receiver of a signalling event transmitted by the reference satellite.

The signalling events may be transmitted at regular intervals by the plurality of satellites, and the apparatus may be arranged to obtain the indication of the transit time for a non-reference satellite by: identifying one or more times-of-arrival of signalling events transmitted by that satellite at the receiver; forming adjusted times-of arrival for the identified signalling events by removing from each signalling event a clock bias associated with that satellite; and selecting, as the obtained indication of transit time, the adjusted time-of-arrival that is closest to the predicted time-of-arrival for that satellite.

The apparatus may be arranged to: obtain, as the indication of the transit time for the reference satellite, a time-of-arrival at the receiver of a signalling event transmitted by the reference satellite at a first time according to a clock associated with the reference satellite; and form the indication of the expected transit time for the non-reference satellite to be a prediction of a time-of-arrival at the receiver of a signalling event transmitted by the non-reference satellite at the first time according to a clock associated with the non-reference satellite.

The signalling events may be transmitted at regular intervals by the plurality of satellites, and the apparatus may be arranged to: obtain, as the indication of the transit time for the reference satellite, a time-of-arrival at the receiver of a signalling event transmitted by the reference satellite at a first time according to a clock associated with the reference satellite; and select, as the obtained indication of transit time for the non-reference satellite, a time-of-arrival at the receiver of a signalling event transmitted by the non-reference satellite at a second time, according to a clock associated with the non-reference satellite, the second time being different from the first time.

The apparatus may be arranged to select the time-of-arrival of the signalling event transmitted by the non-reference satellite to lie within a predetermined time interval of the time-of-arrival at the receiver of the signalling event transmitted by the reference satellite.

The predetermined time interval may be less than or equal to half the time interval between the regular transmissions of signalling events by one of the plurality of satellites.

The apparatus may be arranged to form the residual for a non-reference satellite by performing a subtraction between the adjusted time-of-arrival of a signalling event selected as the obtained indication of transit time and the predicted time-of-arrival for that signalling event.

The apparatus may be arranged to form the residual for a non-reference satellite by: forming adjusted times-of-arrival for the signalling events by removing from each time-of-arrival a clock bias associated with the satellite that transmitted that signalling event; determining a difference between the adjusted times-of-arrival for the signalling events transmitted by the reference satellite and the non-reference satellite; determining a difference between the predicted times-of-arrival for the signalling events transmitted by the reference satellite and the non-reference satellite; and performing a subtraction between the determined differences.

The apparatus may be arranged to predict a time-of-arrival of a signalling event transmitted by the non-reference satellite by summing a time-of-arrival for a signalling event transmitted by the reference satellite with: a difference between a clock bias associated with the non-reference satellite and a clock bias associated with the reference satellite; and the time it would take a signalling event to travel the difference between the estimated distance between the receiver and the non-reference satellite and the estimated distance between the receiver and the reference satellite.

The apparatus may be arranged to form the indication of the expected transit time by summing the obtained transit time for the reference satellite with the difference between the first and second times.

The apparatus may be arranged to determine the position of the receiver by means of an iterative process, the apparatus being arranged to: for the first iteration, estimate each distance between the receiver and one of the plurality of satellites in dependence on the positions of the plurality of satellites at the same predetermined time instant; for subsequent iterations, estimate each distance between the receiver and one of the plurality of satellites in dependence on the positions of the plurality of satellites at different predetermined time instants.

The apparatus may be arranged to, during the subsequent iterations, estimate each distance at the first and second times.

The apparatus may be arranged to determine the position of the receiver by applying a relative weighting to each of the residuals in dependence on a reliability associated with the obtained indications of transit time used to compute those residuals.

The apparatus may be arranged to calculate a DOP parameter in dependence on a clock bias associated with the receiver.

The apparatus may be arranged to: determine that the position of the receiver calculated in dependence on the residuals is incorrect; identify the largest of the residuals and adjust that residual by an amount corresponding to the time interval between regular transmissions of signalling events by one of the plurality of satellites; and recalculate the position of the receiver in dependence on the adjusted residual.

The apparatus may be arranged to determine, for the plurality of satellites, an average line-of-sight velocity, and to select, as the reference satellite, the satellite having the line-of-sight velocity that is closest to the average line-of-sight velocity.

The apparatus may be arranged to determine a direction vector corresponding to an average of the direction vectors from the receiver to each of the plurality of satellites and to select, as the reference satellite, the satellite for which the direction vector from the receiver to that satellite is closest to the average direction vector.

The apparatus may be arranged to select, as the reference satellite, the satellite of the plurality of satellites having either: the closest line-of-sight velocity to the average line-of-sight velocity; or the direction vector to the receiver that is closest to the average direction vector; in dependence on the relative magnitudes of an error in an estimate of position of the receiver and an error in an estimate of the time at which the signals were transmitted from the satellites.

The apparatus may be arranged to select as the reference satellite the satellite of the plurality of satellites having an optimum combination of line-of-sight velocity and direction vector in relation to the average line-of-sight velocity and average direction vector.

The apparatus may be arranged to calculate for each of the plurality of satellites a metric, $\Delta_j^2$, that is given by the following equation:

$$\Delta_j^2 = [|R_{MAX}|\underline{a} \cdot (\overline{n} - n_j)]^2 + [|R_{MAX}|\underline{b} \cdot (\overline{n} - n_j)]^2 + \left[|\Delta t_{MAX}|\left|\frac{\partial \overline{\rho}}{\partial t} - \frac{\partial \rho_j}{\partial t}\right|\right]^2$$

in which:
$\overline{n}$ is a mean of the unit vectors between the receiver and the plurality of satellites;
$n_j$ is the unit vector between the receiver and the 'j$^{th}$' satellite;
$R_{MAX}$ is a maximum error in an original estimate of the position of the GPS receiver;
$\Delta t_{MAX}$ is a maximum error in an original estimate of a transmission time of a signal from one of the plurality of satellites;

$$\frac{\partial \overline{\rho}}{\partial t}$$

is an average line-of-sight velocity of the plurality of satellites;

$$\frac{\partial \rho_j}{\partial t}$$

is the line-of-sight velocity of the 'j$^{th}$' satellite;
a and b are orthogonal unit vectors in a tangent plane of the GPS receiver;
the apparatus being arranged to select as the reference satellite the satellite that when used as the 'j$^{th}$' satellite generates the smallest metric.

The apparatus may be arranged to calculate for each of the plurality of satellites a metric, $\Delta_{j0}^2$, that is given by the following equation:

$$\Delta_{j0}^2 = [|R_{MAX}|\underline{a} \cdot (n_j - n_0)]^2 + [|R_{MAX}|\underline{b} \cdot (n_j - n_0)]^2 + \left[|\Delta t_{MAX}|\left|\frac{\partial \rho_j}{\partial t} - \frac{\partial \rho_0}{\partial t}\right|\right]^2$$

in which:
$n_j$ is the unit vector between the receiver and the 'j$^{th}$' satellite;
$n_0$ is a unit vector between the receiver and the satellite that is being tested as the reference;

$$\frac{\partial \rho_0}{\partial t}$$

is the line-of-sight velocity of the satellite that is being tested as the reference;

$$\frac{\partial \rho_j}{\partial t}$$

is the line-of-sight velocity of the 'j$^{th}$' satellite;

$R_{MAX}$ is a maximum error in an original estimate of the position of the GPS receiver;
$\Delta t_{MAX}$ is a maximum error in an original estimate of a transmission time of a signal from one of the plurality of satellites; and
a and b are orthogonal unit vectors in a tangent plane of the GPS receiver;
the apparatus being arranged to select as the reference satellite the satellite that, when tested as the reference satellite, generates the smallest maximum metric across all 'j' satellites.

The apparatus may be arranged to select a reference satellite by: selecting each of the plurality of satellites in turn as a candidate for being the reference satellite; for each candidate satellite, forming residuals that are representative of a combined error in the indications of expected transit time for the candidate satellite and each of the other satellites; for each candidate satellite, identifying a maximum of the residuals; and selecting as the reference satellite the candidate satellite corresponding to a minimum of the maximum residuals.

The apparatus may be arranged to select a subset of the satellites that are visible to the receiver to be the plurality of satellites in dependence on which the position of the receiver is calculated.

The apparatus may be arranged to designate one of the subset of satellites as the reference satellite.

The apparatus may be arranged to, during a first iteration, calculate the position of the receiver in dependence on a subset of satellites comprising a first number of satellites and to, during a subsequent iteration, calculate the position of the receiver in dependence on a subset of satellites comprising a second number of satellites, said second number being higher than said first number.

The apparatus may be arranged to select the subset of satellites by: forming a candidate set of satellites that are visible to the receiver; successively identifying which of the satellites in the candidate set is associated with the smallest convergence zone and eliminating that satellite from the candidate set until the candidate set consists of a predetermined number of satellites; and selecting the subset of satellites to comprise the predetermined number of satellites in the candidate set.

The apparatus may be arranged to select the subset of satellites to consist of a predetermined number of satellites in the set of visible satellites that have the highest levels of elevation relative to the receiver.

The apparatus may be arranged to select the subset of satellites to consist of a predetermined number of satellites in the set of visible satellites that have the lowest line-of-sight velocities relative to the receiver.

The apparatus may be arranged to calculate the position of the receiver by testing different integer ambiguities for the obtained transit times.

According to a second embodiment of the invention, there is provided an apparatus arranged to determine the position of a receiver by performing a comparison between a fractional part of a time-of-arrival at the receiver of a signalling event transmitted by a first satellite, a fractional part of a time-of-arrival at the receiver of a signalling event transmitted by a second satellite and estimated distances between the receiver and the first and second satellites, and calculating the position of the receiver in dependence on a fractional part of a result of that comparison.

According to a third embodiment of the invention, there is provided a method for calculating the position of a receiver in dependence on the time it takes signalling events to travel from a plurality of satellites to the receiver, the apparatus method comprising, in respect of each satellite: obtaining an indication of a transit time for a signalling event to travel from the satellite to the receiver, the indication of the transit time incorporating an integer ambiguity; and forming an indication of an expected transit time for a signalling event to travel from the satellite to the receiver; the method further comprising: designating one of the plurality of satellites as a reference satellite; comparing the obtained indication of the transit time and the indication of the expected transit time for each non-reference satellite with the obtained indication of the transit time and the indication of the expected transit time for the reference satellite to form residuals that are representative of a combined error in those indications of expected transit time; and calculating the position of the receiver, without calculating the integer ambiguities in the obtained transit times, in dependence on the residuals.

According to a fourth embodiment of the invention, there is provided a computer-readable medium encoded with instructions that when executed by an apparatus for calculating the position of a receiver in dependence on the time it takes signalling events to travel from a plurality of satellites to the receiver, cause the apparatus to, in respect of each satellite: obtain an indication of a transit time for a signalling event to travel from the satellite to the receiver, the indication of the transit time incorporating an integer ambiguity; and form an indication of an expected transit time for a signalling event to travel from the satellite to the receiver; and further causes the apparatus to: designate one of the plurality of satellites as a reference satellite; compare the obtained indication of the transit time and the indication of the expected transit time for each non-reference satellite with the obtained indication of the transit time and the indication of the expected transit time for the reference satellite to form residuals that are representative of a combined error in those indications of expected transit time; and calculate the position of the receiver, without calculating the integer ambiguities in the obtained transit times, in dependence on the residuals.

BRIEF DESCRIPTION OF THE DRAWINGS

For a better understanding of the present invention, reference is made by way of example to the following drawings, in which:

FIG. 1A shows the transmission of signalling events by a GPS satellite;

DETAILED DESCRIPTION OF THE INVENTION

Figure 1B:
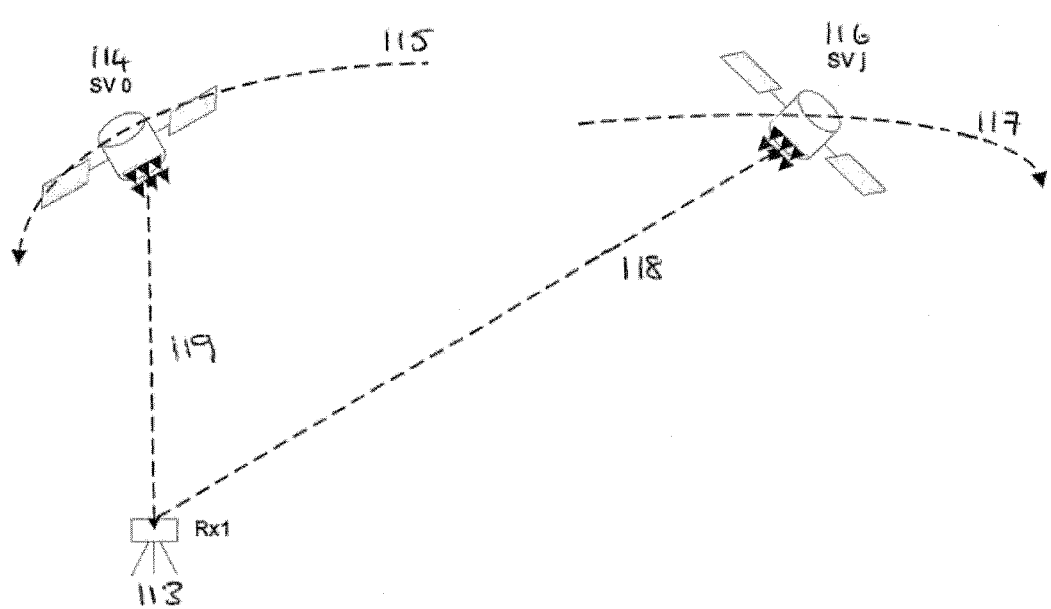
FIG. 1B shows a GNSS receiver receiving signals from two satellites.

An apparatus may be arranged to calculate the position of a receiver in dependence on the times-of-arrival at the receiver of signalling events transmitted by a plurality of satellites. The times-of-arrival are indicative of the transit time that it took each signalling event to travel to the receiver. However, the time at which the signalling events were transmitted may be unknown, and so the times-of-arrival incorporate an ambiguity with respect to the transit time of each signalling event. The apparatus may be arranged to address this ambiguity by designating one of the satellites as a reference satellite. The times-of-arrival of signalling events received from the other satellites are then referenced to the time-of-arrival of one or more signalling events from the reference satellite. Specifically, the apparatus may form a residual that is representative of a combined error in the time-of-arrival of the signalling events from the reference satellite and one of the other satellites when compared with expected times-of-arrivals of those signalling events.

One or more embodiments of the invention may be implemented in a satellite navigation or GNSS system, such as GPS, Globalnaya Navigatsionnaya Sputnikovaya Sistema (GLONASS), Galileo, etc. Therefore, while one or more embodiments of the invention are described below specifically in reference to GPS systems, this is for the purpose of example only and it should be understood that the scope of the invention is not limited to GPS systems.

An example of an event is the occurrence of a 1 millisecond time transition or a code epoch or a data symbol or bit transition, or similar. The event on each satellite results in the almost immediate transmission of a signalling event. There are many such signalling events known to those skilled in the art. The regular repetition of an event is normal in navigation satellite systems. The signalling event may therefore be repetitive, e.g. the start of the C/A code in GPS systems, which repeats at one millisecond intervals. A repetitive signalling event can be considered to travel through space separated from neighbouring events by a wavelength distance analogous to the wavelength of a carrier signal. This wavelength is denoted as $\lambda_c$, and may be referred to as the code wavelength in the case that the events are separated in space by repetitions of a code.

An example of a repetitive signalling event is illustrated in FIG. 1A. This figure illustrates a code repetition cycle in a GPS satellite. Each satellite clock is free-running but is continually steered towards a common absolute time reference (GPS time). The actual time of occurrence of an event is therefore determined on each satellite individually. In FIG. 1A, the code repetition cycle is determined by internal GPS clock 101. Each 1 ms time transition 102 in the internal GPS clock triggers an event, causing the satellite to generate C/A code 103. The generated code incorporates a number of code repetition cycles 104, which each commence at internal code epoch 105 coinciding with the 1 ms time transitions in the internal GPS clock. The generated code is subject to a small delay 106 within the satellite before being transmitted (107). The small internal delay between code generation and code transmission results in a small offset between internal code epochs 105 and external code epochs 108. The external code epochs are spaced at 1 ms intervals and thus can be considered to represent an externally-observable version of the satellite GPS clock. The code is then subject to a further delay due to the transit time of the signal 109. The GPS receiver may then align an internal code replica 111 with the received code 110 to generate the internal code epochs 112 from which the time-of-arrival of the signalling events represented by those code epochs can be determined.

Typically each satellite will include information in its signal to enable the receiver to work out the absolute time at which a particular signalling event was transmitted by the satellite. In practice, the satellite will have transmitted the signalling event according to its own clock, which will normally be offset from absolute time. However, since the receiver knows what this offset is—either from the ephemeris or some other source—it can allow for this offset when comparing the time it took various signalling events to travel from the satellite to its location. When the receiver is subject to poor signal conditions, however, it may not be able to decode the transmission time information. Although this problem can be overcome by estimating the transmission time, this still leaves an ambiguity in the times-of-arrival of the signalling events at the receiver that needs to be resolved.

The receiver may measure a time-of-arrival for a satellite signal by identifying a signalling event in the received signal. One option is for the receiver to perform a correlation operation, or equivalent processing step, between the received signal and a locally-generated version of a PN spreading code. As a result of this process, the receiver aligns an internally generated replica code with the spreading code received from the satellite. In so doing, the receiver is able to identify when it received a particular 'event' (e.g. the start of a particular code sequence) according to its own internal clock. If the receiver estimates the time when the signal was transmitted by the satellite, it can subtract it from the time-of-arrival to obtain an estimated transit time. Unfortunately, the code wavelength is often shorter than the distance between user and satellite, so the 'event' that the receiver can identify is not unique but is repeated every code repetition interval. In other words, although the receiver might identify an event in the signal having a time-of-arrival $t_1$, a similar event will have occurred in the signal at time $t_1-t_C$ and another will occur at time $t_1+t_C$, where $t_C$ is the code repetition interval. To the receiver, these events may be indistinguishable from each other, particularly at low signal levels. Without being able to decode more of the signal, the receiver does not know directly which time-of-arrival to compare with the estimated transmission time. So, while the receiver does know the sub-$t_C$ part of the time-of-arrival, it is not clear which is the correct integer part. This leaves unknown the number of code repetition intervals, $t_C$, in the signal transit time.

The C/A code of civil application GPS signals repeats at 1 millisecond intervals. Under weak or briefly glimpsed signals, the receiver may only be able to achieve synchronisation with the one-millisecond C/A code. The unidentifiable integer component of the transit time will therefore be an integer number of milliseconds while the identifiable fractional component will be sub-one millisecond. For GPS, the integer millisecond part of the transit time may typically range from 67 to 86 milliseconds for satellites above a user's horizon, resulting in a large number of ambiguous event identifications. In another example, a GPS receiver may achieve a greater degree of synchronisation the GPS signals, in which case the fractional part of the transit time may be greater than one millisecond. For example, if the GPS receiver manages to achieve data bit or data symbol synchronisation with the GPS signal, the remaining fractional part of the transit time will be less than a data symbol or bit interval, which is 20 milliseconds.

Thus, when the receiver is subject to weak or briefly-glimpsed signals, the receiver may only be capable of measuring a fractional part of the transit time (as represented by the unambiguous part of the time-of-arrival).

The term 'fractional' is used herein to refer to any part or subdivision of the transit time of a satellite signalling event. The term 'fractional' is intended to cover any modulo value that may be defined by a satellite navigation signal, either now or in the future. The fractional part of the transit time will commonly be less than a code repetition interval. The entire transit time will typically comprise both fractional and integer components, but under poor signal conditions the integer component may be ambiguous and not identifiable. The word 'integer' thus refers to any unobserved or ambiguous part of the transit time and is intended to cover any quotient value that may be defined by a navigation signal, either now or in the future. The integer component may represent an integer number of code repetition intervals comprised in the transit time.

The term 'time-of-arrival' is used to refer to the time at which a signalling event is received by the receiver. The time-of-arrival provides an indication of the transit time of the signalling event.

The time of arrival of a signalling event may be measured with respect to a timebase within the receiver. The known timescale of the receiver clock may be used to form estimates of the time difference between the arrival of signalling events from different satellites. The calibration of the receiver timebase with respect to an absolute time (such as GPS time) is an undetermined receiver parameter. The calibration may be achieved by performing a calculation to solve for the receiver's location. The invention described herein avoids the need for any such calibration by using the known timescale of the receiver clock to form estimates of the time difference between the arrival of signalling events from different satellites. The offset or bias between the receiver clock and absolute time thus does not contaminate the measurements. The timescale is known through the detailed design of the receiver system. Typically, the timescale exhibits a small (time) bias rate compared with absolute time due to component tolerances during receiver manufacture. A preferred embodiment of the invention reduces the dependence upon bias rate to negligible proportions by selecting signalling events that arrive within a short time of each other.

Some existing methods for calculating the position of a GPS receiver in the absence of GPS time address the ambiguity in the measured times-of-arrival by calculating the integer component of the transit time. This calculation typically uses the initial estimate of the receiver's position and the initial estimate of when the signal was transmitted to estimate a distance between the receiver and the satellite. Since the satellite signals travel at the speed of light, which is known, the estimated distance can be used to estimate the entire transit time, including the integer number of code repetition intervals, $t_C$. One or more embodiments of the invention may be distinguished over these pre-existing techniques by being capable of resolving the integer ambiguity without having to calculate a value for that integer.

The apparatus may typically use signals from five or more satellites to obtain a 3D location-fix on the receiver. If an additional constraint is placed upon the algorithm (e.g. by fixing the receiver's height), then the location algorithm might require fewer than five satellites. One of the satellites may be designated as a reference satellite. The estimated distances and transit times for the other four satellites can then be compared with the equivalent values for the reference satellite. This has two advantages: first, it addresses the issue of integer ambiguity in the measured times-of arrival; and second, it removes the receiver clock bias as an unknown at the instant of measurement, as the arrival of each signalling event is measured with reference to the arrival of the signalling event from the reference satellite. In this way, the receiver clock bias does not contaminate the measurements and does not enter into the location calculations. The receiver clock is used, however, to provide a timescale for measuring the time differences between the arrival times of the various signalling events.

The apparatus for calculating the location of a receiver described herein may be arranged to calculate the receiver's location using an initial estimate of absolute time and receiver position. The calculation may also use ephemeris information so that the estimated position of the satellite at the estimated absolute time can be determined. The estimates of receiver position may be based e.g. on a previously calculated position of the receiver or on an estimate of position received from another source, such as a cellular network or by manual input or from a data input port on the user equipment. The estimate of absolute time may similarly be based on a previously calculated value that has been updated with the time that has elapsed since, or a version of absolute time obtained from a different source from the satellite (e.g. from a cellular network), from the receiver clock, through manual input or from a data port. The ephemeris information may have been stored from a previous location calculation, may be obtained from a source other than the satellite (e.g. from a cellular network), or could be obtained directly from each satellite as required, either in a continuous data stream or as disjoint segments of the broadcast ephemeris information.

For the location solution determined by means of the received signalling events to be accurate, the initial estimate of the distance between the satellite and the receiver should be accurate to within half of the code wavelength, $\lambda_C/2$. For GPS C/A code signals, this gives a required accuracy of 0.5 ms multiplied by the speed of light, which is approximately 150 km. If the estimated distance is in error by more than $\lambda_C/2$, there is a risk that the error may cause an 'integer rollover', i.e. result in an incorrect value for the integer part of the estimated transit time. An integer rollover may also be caused by the receiver clock bias. In particular, the receiver clock bias may cause an integer rollover if, when added to the estimated transit time, the result lies close to an integer $t_C$ boundary. One or more embodiments of the invention may remove this dependence upon the receiver clock by measuring time-of-arrival relative to a moving time base that depends on the incoming signals from the satellites. This may be achieved by comparing each time-of-arrival or part thereof with a time-of-arrival of a signalling event received from a reference satellite.

The apparatus for calculating the position of the receiver may include the receiver or may be located in the same piece of equipment as the receiver (from which the measured components of the transit time can be obtained). In a preferred embodiment, the apparatus may be a handheld device. The apparatus may also be separate from the receiver. For example, the apparatus may be a server. In this scenario the receiver suitably sends the times-of-arrival to the apparatus over a communication link. The apparatus may similarly return to the receiver the result of the location calculation. The communication link may take one of several forms commonly known in the art, such as wireless communication, packet communication, pager system, internet or other wired form of communication link.

Each satellite may emit a spreading code sequence, which is a unique pseudo-noise code specific to the emitting satellite in a CDMA system. By means of the alignment of an identical code replica within a receiver, features of the code sequence can be identified and extracted. One such feature is the code epoch which is defined as the start position of the code sequence. For GPS C/A code, this condition typically occurs when the two generator registers (G1 and G2 as defined in IS GPS 200E or predecessor versions) transition into a state where the registers contain the 'all ones' condition. The continuous transmission of the code sequence can thus be represented as a repetitive series of signalling events, each equivalent to the transmission of the code epoch. The time of reception of the signalling event may be determined from an equivalent replica code generator in the receiver, as aligned with the received signal from the satellite, at the instant when it too arrives at the same transition into the 'all ones' state.

The various embodiments described herein involve values represented in units of both distance and time. These values often relate to the transit of GPS signals, which have a known speed (the speed of light), and so can generally be readily converted from values expressed in terms of distance into values expressed in terms of time and vice versa. The equations given below are generally expressed in terms of time as this is the basis upon which the satellite signal receiver makes its measurements of the arrival of signalling events. However, equivalent distance quantities may be derived through multiplication by the speed of light. The equations below can therefore readily be converted between being expressed in terms of distance and being expressed in terms of time and are not intended to be limited in scope to the particular form in which they are expressed below.

Introduction of the Single-Difference Method

FIG. 1B shows a GPS receiver 113 receiving GPS signals 118 and 119 from two GPS satellites, 114 and 116. Each satellite is travelling according to a respective orbit (115 and 117). The GPS receiver may designate one of these satellites as a reference satellite. This satellite sets the time base against which all other signals are measured.

First consider the case of a signal received from single satellite 114. The time-of-arrival of signal 119 at GPS receiver 113 can be expressed as:

$$t_{rx,j} = t_{sat,j} + \frac{D_j(t_{sat,j})}{c} + \frac{(B_U - B_{SV,j})}{c} + \frac{(d_{iono,j} + d_{tropo,j})}{c} + \varepsilon_j \quad (1)$$

where:

$t_{rx,j}$ is the arrival time of the GPS signal transmitted by satellite j at the receiver (which in this instance is the full time-of-arrival rather than just the fractional part; ambiguity in the measured time-of-arrival and how it may be resolved are discussed later);

$t_{sat,j}$ is the absolute time when the signal was transmitted by the $j^{th}$ satellite;

$D_j(t_{sat,j})$ is the distance between the receiver and satellite j at the time when the signalling event was transmitted;

$B_U$ is the receiver clock bias, expressed in terms of distance;

$B_{SV,j}$ is the clock bias of satellite j, expressed in terms of distance;

$d_{iono,j}$ and $d_{tropo,j}$ are the excess delays due to signal transition through the ionosphere and troposphere, over those in free space, expressed in terms of distance;

$\epsilon_j$ is the measurement error, which is mainly due to noise and multipath errors; and c is the speed of light in meters per second.

Equation (1) defines that the time-of-arrival of a signalling event at the receiver is a function of the time at which the signalling event was transmitted and the time the event took to travel from the satellite to the receiver. Equation (1) is expressed in terms of time because the fundamental process in signal propagation is one of time delay. Hence the distance terms in (1) are divided by the speed of light to convert these into the basic time delay quantities. Although equivalent distance quantities may be used, these are derived quantities in a measurement procedure and can be obtained through multiplication of the time delay by the speed of light, c.

Equation (1) can be extended by comparing signal 119 received from satellite 114 with signal 118 from reference satellite 116. Rather than consider each time-of-arrival independently, the receiver may measure only the difference between the arrival times. This eliminates the receiver clock bias, which is identical for both. The receiver clock bias is the difference between the time held in the receiver clock to an absolute or reference time, such as GPS time. If it is assumed that the transmitted events occurred at the same GPS time (as measured by each satellite), this gives the following equation:

$$t_{rx,j} - t_{rx,0} = \frac{D_j(t) - D_0(t)}{c} + \frac{(B_{SV,0} - B_{SV,j})}{c} + \frac{(d_{iono,j} - d_{iono,0} + d_{tropo,j} - d_{tropo,0})}{c} + (\epsilon_j - \epsilon_0) \quad (2)$$

Where the reference satellite is designated by the subscript '0' and t designates the absolute time corresponding to the signalling event transmitted by each satellite.

The bias of the receiver clock, compared with absolute time, is eliminated for those cases where the signalling events arrive at the receiver simultaneously. When this does not happen, there is a small error in the measured difference in arrival times due to the scale factor of the receiver clock not being exactly the same as the scale of the absolute clock. This is basically the rate at which the clock produces 'second value' pulses or, alternatively, the frequency of the local oscillator. With receiver clock scale accuracies of the order of 1 part in $10^6$ or less, these additional errors in measuring the relative arrival times are usually less than 1 ns. These terms are, therefore, negligible in most applications.

The actual distances between the receiver and each satellite are unknown ($D_j(t)$ and $D_0(t)$). However, these values can be estimated using initial estimates for the receiver's position and the GPS time at which the signalling event was transmitted. These estimates may be improved using iterative techniques after sufficient measurements have been taken. The initial estimate of GPS time can be used with the appropriate ephemeris information to estimate the position of the satellite. As mentioned above, the estimates of receiver position may be based e.g. on a previously calculated position of the receiver or on an estimate of position received from another source, such as a cellular network. The estimate of GPS time may similarly be based on a previously calculated value that has been updated with the elapsed time, on a version of GPS time obtained from a different source from the satellite (e.g. over a wireless link; from a cellular network; from an external clock; by manual entry), or simply from the receiver clock. The ephemeris data may have been stored from a previous location calculation or may be obtained from a source other than the satellite directly (e.g. from a cellular network or data port or elsewhere as in the list above).

Additional unknowns in equation (2) are the full times-of-arrival, $t_{rx,j}$ and $t_{rx,0}$, since under poor signal conditions the satellite navigation message may be inaccessible, only a fractional part of those times-of-arrival will be known. Equation (2) also includes error terms $B_{SV,0}$ and $B_{SV,j}$ which correct for the clock offsets of the satellites' reference clocks with respect to absolute time (GPS) so that all the receiver time of arrival measurements are brought onto a common timebase.

Figure 2:
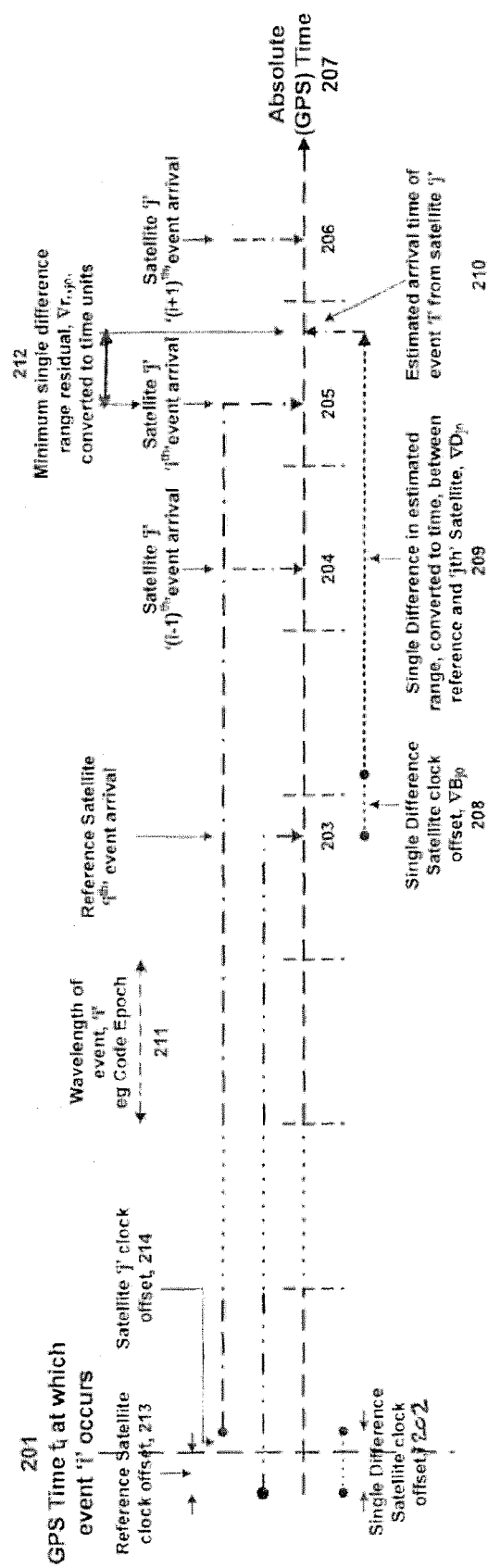
FIG. 2 shows the timing of two GNSS signals relative to absolute time with the signalling events materially transmitted at identical times from each member of the satellite constellation.

However, referencing the arrival times of signals from the reference satellite and the '$j^{th}$' satellite to each other enables the ambiguity in the measured, fractional parts of these arrival times to be resolved without the need to calculate the integer parts of those arrival times. This will be explained initially with reference to FIG. 2, which illustrates the timing of events at a target user receiver. FIG. 2 illustrates one preferred method by which the measurement of signalling event arrival times is used to resolve the transit time ambiguity generated by repetitive signalling events.

Common-Transmission Interval

The horizontal axis of FIG. 2 represents absolute time (207). For the GPS satellite system, this is GPS time as held at the US Naval Observatory in Washington D.C. At time 201, a repetitive event 'i' occurs in the satellite constellation. An example of an event might be the occurrence of a 1 ms time transition or a code epoch or a data symbol or bit transition, or similar. As each satellite clock is free-running but steered towards a common absolute time reference (for example, GPS time), the actual time of occurrence is determined on each satellite individually. There are many such choices for the signalling events known to those skilled in the art since the identified event is repetitive. The event on each satellite results in the immediate transmission of a signal. These are referred to as 'signalling events'. The regular repetition of an event 'i' is normal in navigation satellite transmissions using ranging techniques. The signalling event can be considered to travel through space, separated from neighbouring events by a wavelength distance analogous to the wavelength of a carrier signal. This wavelength is denoted as $\lambda_c$ (211) and is often referred to as the code wavelength.

The moment of emission from the satellite antenna's code phase centre is identified generally by event 201 but modified, as described above, for each individual satellite by the satellite's reference clock offset. The reference satellite '0' has a clock bias shown as the time interval 213. The reference satellite, shown in the FIG. 2, transmits the signal associated with event 'i' before the correct GPS time. A second satellite, denoted as 'j', has a satellite clock bias 214 which results in a delayed transmission of the signal associated with the event 'i'. The difference between the reference and '$j^{th}$' satellite clock biases is shown as the interval 202 as the "single-difference satellite clock bias". This time interval is also shown as the identical interval at 208 but commencing at the instant of the reference satellite's $i^{th}$ signalling event arrival, 203. The arrival of the signal from the satellite 'j' in response to the transmission of signalling event 'i' is received at time 205.

The repetitive events such as 'i' are at least partially, indistinguishable from each other, particularly at low signal levels. This is indicated in FIG. 2 by the arrival from satellite 'j' of signalling events 'i−1' and 'i+1' (shown at 204 and 206 respectively). The times-of-arrival of all three of these events is indicative of a transit time it took those events to travel to the receiver, and therefore each time-of-arrival incorporates an ambiguity with respect to those transit times.

The estimated distances between the receiver and each of the satellites are calculated, based on the estimate of absolute time and the satellite ephemeris information. The difference between these estimated distances is shown in FIG. 2 as $\nabla D_{j0}$ (209). Adding the range difference to the single difference of the satellite clock biases, $\nabla B_{j0}$, gives an estimate of the time difference to be expected between the arrival of the signals associated with event 'i' from each satellite. This value can be combined with the time-of-arrival of the reference satellite signal '0' to determine an expected arrival time for the '$j^{th}$' satellite signal (210). As illustrated in FIG. 2, any of 204, 205, 206, or similar arrival times, could be candidates for the correct arrival time.

Preferably, the time-of-arrival is selected to be that arrival time which minimises the single difference range residual $\nabla r_{rxj0}$ (212). In FIG. 2, the correct choice for the signalling event arrival time is 205 as the single difference range residual given by times 204 and 206 are both larger (and larger than half the code wavelength, $\lambda_c/2$). The algorithm may be designed to select the correct arrival time for the signal associated with event 'i' from satellite 'j' provided the error in estimating absolute time is small and the estimated location of the receiver lies within a region which is defined as a convergence zone. If the receiver's estimated location does lie within the convergence zone, as discussed below, the time-of-arrival measurements selected using the process described above uniquely identifies, in a single step, the correspondence of the received events to the estimated range difference between the reference and $j^{th}$ satellites. Errors in the estimate of absolute time cause errors in the estimated locations of the satellites (for example, satellite '0' and satellite 'j'). These errors are ultimately reflected in errors in $\nabla D_{j0}$ (209) and are constituent parts which define a convergence zone, inside of which the algorithm operates correctly.

If the user receiver lies outside the convergence zone, a next best choice for the correct signal arrival time might be 206 (the arrival time with the next to minimum range residual). In order to test the correctness of this alternative choice, a metric is required such that the metric is minimized (or maximized) when the correct convergence zone is selected.

If there are 6 or more satellite signals present at the receiver input, at suitable signal levels, it is possible to test if the single difference range residuals and the correspondence between transmitted and received signalling events has been correctly selected. A suitable metric for the procedure involves determining the 'a posterior' (i.e. post location solution) range residuals between each of the satellite's positions and the estimated user position. If the sum of the squares of the range residuals is large (greater than a predefined threshold of, for example, 100 m² per satellite contribution), it is likely that the initial estimate of user position lies outside the convergence zone. An iterative procedure may be invoked to expand the area of the convergence zone, thereby rapidly finding the correct region for the initial estimate of the user position from which the minimum 'a posteriori' range residual solution can be found. This enhanced convergence zone solution technique is more completely described below.

Working through the process described above and illustrated in FIG. 2 identifies the full times-of-arrival that minimise the single difference residual. The residual is indicative of an error in the original estimates of position and time. With the full times-of arrival having been identified, the initial estimates of position and time can now be updated based on the identified arrival times.

The diagram in FIG. 2 is not intended to limit the invention to any particular sequence of steps for identifying the correct time-of-arrival for a signal transmitted by a GPS satellite. FIG. 2 is rather provided to aid understanding of how comparing relative timings resolves the ambiguity in times-of-arrival in a single step when the initial user position lies within an identified convergence zone. The arrangement shown in FIG. 2 is only one of many that are capable of correctly identifying time-of arrivals. As one example, the signals from the reference satellite could arrive either before or after those from satellite 'j'. The various components used in the calculation of the minimum single difference range residual could be combined in any associative order to form the same conclusion as to the correct arrival times. Those skilled in the art will appreciate that any suitable combination of the arrival times, estimated ranges between the satellite and user receivers and the satellite clock offsets could be used to identify the correct arrival time of the signal from satellites '0' and 'j'.

The single difference residual can be expressed by the following equation (on this occasion expressed in terms of distance, but has been derived from a similar expression using transition times):

$$\nabla r_{rx,j0} = \nabla R_{rx,j0} - (\hat{D}_j(t_e) - \hat{D}_0(t_e)) + \nabla B_{j0} \qquad (3)$$

where:
$\nabla r_{rx,j0}$ is the single difference residual, the error arising from errors in the original estimates of GPS time and GPS receiver position;
$\nabla R_{rx,j0}$ is the difference in range between the reference satellite and satellite j as indicated by the times-of-arrival of the signals from those satellites;
$\hat{D}_j(t_e)$ is the estimated distance between the GPS receiver and the reference satellite at the estimated GPS time, $t_e$;
$\hat{D}_0(t_e)$ is the estimated distance between the GPS receiver and satellite j at the estimated GPS time, $t_e$; and
$\nabla B_{j0}$ is the difference in the clock biases of the reference satellite and satellite j.

Equation (3) assumes that the ionospheric and tropospheric delays can be ignored or corrected using broadcast models or by other means (such as by dual or triple frequency measurements) or are absorbed into the measurement noise term.

As can be seen from equation (3) and FIG. 2, the residual is representative of a combined error in the expected times-of-arrivals of signals transmitted by the reference satellite and the '$j^{th}$' satellite when compared with the actual times-of-arrival of those signals. By using this combined error as the basis for calculating an improved estimate of receiver position, rather than the transit time of the signals, the unknown receiver clock bias has been removed as an unknown at the instant of measurement, and plays no part in forming the update.

The operation shown in FIG. 2 may be performed for all satellite measurements (j∈1 . . . n) to generate a full set of single difference measurements. Typically, the measurements from a minimum of five satellites (one reference satellite and four other satellites) will be required for a 3D-location fix. The single difference range residuals are then used to calculate the position and absolute time update.

Various mathematical techniques can be employed to generate the updated position and time. These techniques are well-known in the art and will not be described in detail, although a brief explanation of one suitable technique is given below for completeness. However, it should be understood that this is for the purposes of example and to demonstrate the existence of known methods. In general, any suitable alternative method may be employed for updating the initial estimates of position and absolute time in view of the measured arrival times.

Equation (3) defines a single difference residual as representing an error in the originally estimated distances between the receiver and the satellites when compared to the ranges that are indicated by the measured arrival times of the satellite signals. The estimated distances are themselves dependent on the initial estimates of receiver and satellite positions, with the latter being dependent upon absolute time. Therefore, it is possible to express the single difference residual in terms of those initial estimates.

The distance between the $j^{th}$ satellite and the receiver may be defined as the Euclidean norm of the difference in vector positions, $(x_{SV,j} - x)$, where $x_{SV,j}$ is the position vector of the $j^{th}$ satellite and $x$ is the position vector of the receiver. The estimated distance between the $j^{th}$ satellite and the receiver may be defined as the Euclidean norm of the difference in vector positions, $(x_{SV,j}(t_e) - x_e)$, where $x_{SV,j}(t_e)$ is the position vector that corresponds to the location of the $j^{th}$ satellite at an initial estimate of (GPS) time $t_e$ and $x_e$ is the position vector corresponding to an initial estimate of the location of the receiver. This gives rise to the following equations:

$$D_j(t) = \sqrt{(x_{SV,j}(t) - x)^2 + (y_{SV,j}(t) - y)^2 + (z_{SV,j}(t) - z)^2} \quad (4)$$

$$\hat{D}_j(t_e) = \sqrt{(x_{SV,j}(t_e) - x_0)^2 + (y_{SV,j}(t_e) - y_0)^2 + (z_{SV,j}(t_e) - z_0)^2}$$

The expression for $\hat{D}_j(t_e)$ can be substituted into equation (3) to give an expression for the single difference residual in terms of the initial estimates of receiver position and GPS time. The aim is then to compute updated estimates for receiver position and GPS time using the full times-of-arrival identified using the process illustrated in FIG. 2. However, the result of substituting equation (4) into equation (3) is a non-linear equation that is not readily solved. A pragmatic, and commonly used, approach is to linearly expand equation (3) around the initial estimates $(x_e, t_e)$ using a power series such as Taylor's Series. Provided the time and distance errors are small enough to satisfy the requirements of a linear model, the distances can be replaced by equations using only the first few terms of the power series. Specifically, the equations (4) can be made linear using only the first two terms of the power series expansion. This method is well known to those of skill in the art.

Using a Taylor Series approximation, limited to the first two terms, equation (3) can be written as:

$$\begin{vmatrix} \nabla r_{10} \\ \nabla r_{20} \\ \vdots \\ \vdots \\ \nabla r_{n0} \end{vmatrix} = \begin{vmatrix} -\nabla\cos(\alpha_{x1}^0) & -\nabla\cos(\alpha_{y1}^0) & -\nabla\cos(\alpha_{z1}^0) & (\dot{\rho}_1 - \dot{\rho}_0) \\ -\nabla\cos(\alpha_{x2}^0) & -\nabla\cos(\alpha_{y2}^0) & -\nabla\cos(\alpha_{z2}^0) & (\dot{\rho}_2 - \dot{\rho}_0) \\ \vdots & \vdots & & \\ \vdots & \vdots & & \\ -\nabla\cos(\alpha_{xn}^0) & -\nabla\cos(\alpha_{yn}^0) & -\nabla\cos(\alpha_{z2}^0) & (\dot{\rho}_n - \dot{\rho}_0) \end{vmatrix} \begin{vmatrix} \Delta x \\ \Delta y \\ \Delta z \\ \Delta t \end{vmatrix} \quad (5)$$

Or, more compactly in matrix form, as:

$$\nabla r = \nabla H \cdot \Delta X$$

where $\nabla r_{j0}$ are the single difference range residuals for the $j^{th}$ satellite and the reference satellite;

$\nabla\cos(\alpha_{xj}^0)$, $\nabla\cos(\alpha_{yj}^0)$ and $\nabla\cos(\alpha_{zj}^0)$ are the differences in the direction cosines for the $j^{th}$ satellite and the reference satellite;

$\nabla H$ is defined as the single difference observation matrix, which can be derived from the observation or geometry matrix;

$\dot{\rho}_j$ is the velocity of the $j^{th}$ satellite resolved along the line-of-sight between the receiver and the $j^{th}$ satellite; and $\Delta x$, $\Delta y$, $\Delta z$ and $\Delta t$ are the errors in the originally estimated user position and GPS time.

The final column of matrix $\nabla H$ may be divided by factor K as a pre-conditioner, to improve the conditioning of the geometry matrix. For example, a pre-conditioner of 1000 may be used, which effectively converts the $\dot{\rho}$ from meters per second to meters per millisecond. Pre-conditioning makes no difference to the solution but may improve numerical stability, particularly for fixed point implementations.

Notice that equation (5) does not include the user's receiver common (or clock) bias as referencing all measurements to a time base set by the reference satellite has removed this as an unknown element at the instant of measurement.

The equation can be exactly solved with a minimum of four single difference measurements (using five satellites). There is a unique solution which provides corrections to (x, t):

$$\Delta x = \nabla H^{-1} \cdot \nabla r \quad (6)$$

The new estimate for the position vector of the receiver and absolute time becomes:

$$x = |X_e, t_e| + \Delta x$$

$$x = |xyzt|^T \quad (7)$$

This process is distinguished from the prior art in that: (i) no calculation is required to determine the integer milliseconds in the times-of-arrival; (ii) no rounding process is required; and (iii) there is no iterative procedure required to find the correct time of the arrival of the event 'i' from satellite 'j'. Instead, a simple selection of the correct arrival time may be made by minimising the single difference range residual, providing the correct solution when the user position is within a convergence zone. Note that the process of minimizing the signal difference range residual involves the satellite clock bias terms, previously overlooked in the prior art.

If there are more measurement residuals than unknowns, a least squares solution, which minimizes the norm between the a posteriori measurement residuals and resulting location solution, can be found using the Moore-Penrose Inverse, otherwise known as the pseudo-inverse, of the single difference geometry matrix, $\nabla H$. The least squares solution may use weighted single difference measurement residuals if there is an available measure of their quality. Such solutions are then known as weighted least squares solutions. These can be useful in de-weighting noisy or unreliable measurements, including, for example, those arising from satellite measurements at low elevation angles in which there is a higher uncertainty due to ionospheric or tropospheric errors contributions.

Another situation in which a weighted least squares solution is desirable is where the measurements have been taken from different satellite constellations, in which the user equivalent range errors (UERE) are significantly different.

This enables a less accurate system (with higher UERE) to be weighted lower in the solution than the more accurate measurements.

For an (un-weighted) least squares solution with a number of satellites greater than five, the update to the estimate of user position and GPS time is found from:

$$\Delta x = (\nabla H^T \cdot \nabla H)^{-1} \cdot \nabla H^T \cdot \Delta r \quad (8)$$

In order to be able to efficiently invert the matrices of the previous equations, there are necessary conditions that must be fulfilled. These are that the determinant of $\nabla H$ or $(\nabla H^T \cdot \nabla H)$ must not be zero:

$$\text{Det}(\nabla H) \neq 0 \text{ or}$$

$$\text{Det}(\nabla H^T \cdot \nabla H) \neq 0 \quad (9)$$

However, even if the matrix is not singular, this condition alone does not guarantee that the equations are well-conditioned. Specifically, the equations are not well-conditioned if any of the $(\dot{\rho}_j - \dot{\rho}_0)$ terms are near zero. This condition can occur even for satellites in that lie in different directions from the receiver (i.e. are in different parts of the sky). Single difference measurement residuals with this condition degrade the estimation performance of GPS time. Such measurements could be excised, if required, to eliminate the noise and multipath contributions from the identified satellite.

A further aspect to the conditioning of the single difference matrix, $\nabla H$, relates to its condition number. The condition number of a matrix is a well-known metric. There are a number of derivations and these are typically based on an operator which provides a matrix norm, $\|A\|$. The general form for the condition number $\kappa$ is:

$$\kappa = \|A\| \cdot \|A^{-1}\| \quad (10)$$

For a norm operator, $\|\bullet\|$, in an $L_2$ space, a simplified form of the conditioning number for a normal matrix can be derived from the ratio of the largest and smallest eigenvalues. This simplification does not provide a solution for unitary matrices. However, $\nabla H$ in the GPS location problem solution is not unitary. If the condition number is large, the process of inversion of the matrix by a computational machine can be subject to significant numerical errors due to the rounding process in digital machines with finite numerical range.

In the case of determining absolute (GPS) time, it can be established that the condition number of the single difference geometry matrix, $\nabla H$, is large. The cause of this lies in a disparity of the errors in the two different variable classes, range or equivalent time differences for the position vector in the first instance and GPS time error measured through velocities in units of meters/second. Through a suitable change of scale, the conditioning number can be made smaller by perhaps a factor of $10^3$. One suitable means to re-scale the variables is by changing the line-of-sight velocities to a scale of meters/millisecond (a factor of $10^3$ over the natural scaling, as mentioned above).

A step-by-step illustration of the method described above is shown in FIG. 3. The method may be applied in any suitable apparatus in communication with the receiver for obtaining the measured arrival times. The apparatus could be located in the same equipment as the receiver, in equipment adjacent to the receiver or in equipment remote from the receiver.

At step 300, the apparatus obtains navigation data containing ephemeris parameters for members of the visible satellite constellation. At step 301, the direction cosines to each of the satellites, for which data is available, are computed using the a priori estimate of absolute time and user position. At step 302, a selection is made of the algorithm to be used to select the best satellite to use as the reference. At step 303, the selection algorithm is implemented. In addition, the estimated distance to the reference satellite is also computed. At step 304, one of the satellites denoted as satellite 'j', which has not otherwise been processed and is not the reference satellite, is selected. An estimated range is computed between this satellite at the estimated absolute time and the estimated user position. At step 305, the receiver measures the arrival time of the signalling event used to form a range from this satellite together with the similar signalling event from the reference satellite. Corrections are applied for the satellite clock offsets and the single difference in estimated satellite transit times. These figures can be converted to equivalent range estimates as required. From this measurement data, a single difference measurement residual is formed for satellite 'j' which minimises the value of $\nabla r_{j0}$. The process is repeated, at step 306, for all the members of visible constellation for which ephemeris information is available.

Figure 4:
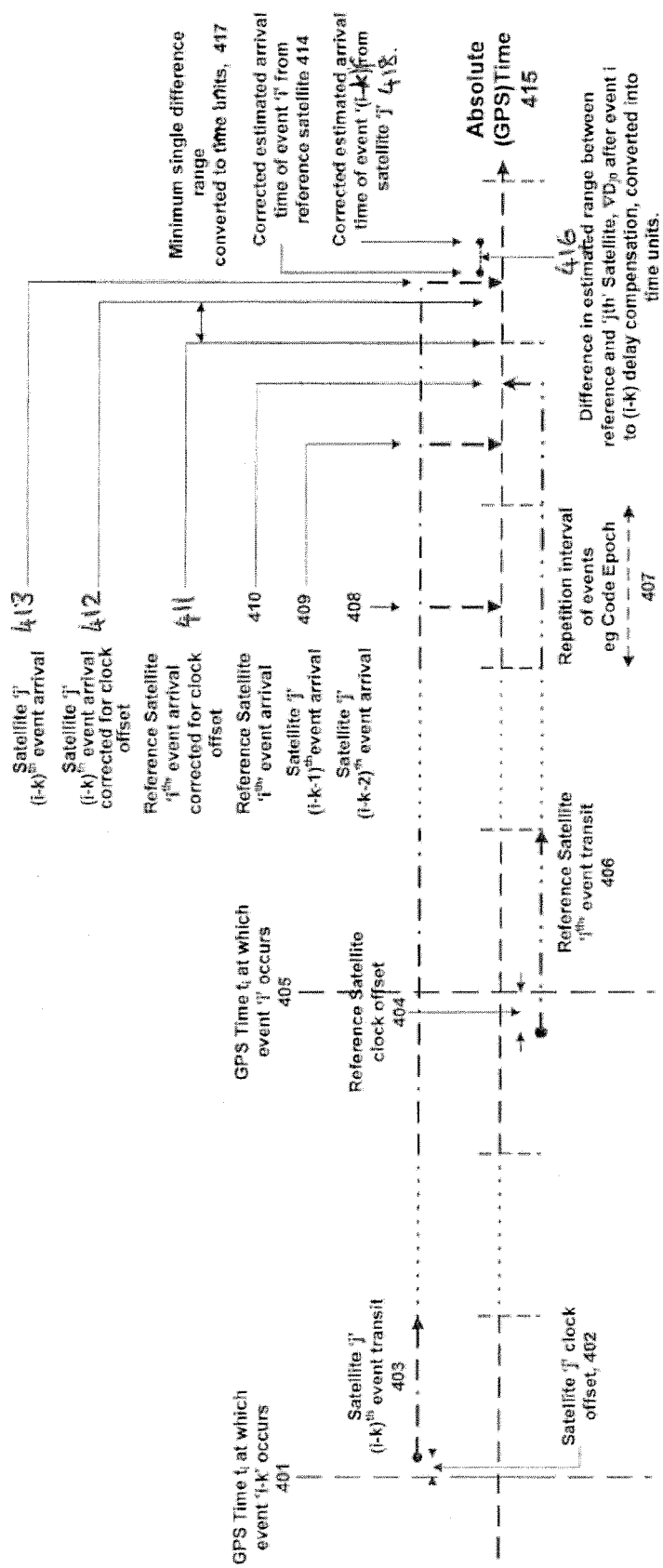
FIG. 4 shows the timing of two GNSS signals that are transmitted at different times relative to absolute time.

At step 307, when all the satellite measurement data has been received and single difference measurement residuals have been computed, a computation is performed to establish a correction to the initial estimate of the user position, based on the satellite measurements. A further result of the computation is that a correction to the estimate of absolute time is obtained. The new estimates of user position and absolute time can be used again in the same computation to obtain better estimates through a process of iteration (an example of an iterative procedure is shown in FIG. 4). This is often beneficial as the improved user position and absolute time estimates result in improved direction cosine values, even though no new measurements are available or processed. The process usually only requires only a few iterations before the results become stable. After this stage, further iterations tend not to improve the result. At step 308, the resulting user position and absolute time can be further processed by means known in the art to estimate the local receiver clock common bias term, if required.

The explanation above assumes that all event-related signals are transmitted substantially at the same time (according to the satellite's own clocks, which are bias by different amounts from absolute time). In other words, transmission is assumed to occur more or less simultaneously at all satellites in the constellation at the estimated absolute time, $t_e$ (see e.g. FIG. 2). However, this is not a necessary limitation of the method. Other measurement arrangements are also possible, in which the transmission of signalling events corresponding to the reference and $j^{th}$ satellite are separated in time. Indeed, this can be advantageous in some scenarios: for example, if the receiver is moving during the measurement interval (as explained below) or to minimize errors due to the slight difference in timescales of the absolute time and receiver clocks.

Common-Reception Interval

Typically any separation in the transmission times of two different events from two different satellites corresponds to an integer number of code repetition intervals. By applying similar reasoning to that followed above, the expected arrival times for different events can be determined using the integer number of code repetition intervals that will separate their transmission times, the difference in the estimated distances between the receiver and the reference satellite and the receiver and the $j^{th}$ satellite and the difference in the satellite clock offsets. One reason for choosing to use the arrival of different events at the receiver is that it enables the arrival times of those different signalling events to be selected to lie within a specific time interval. For example, it might be beneficial to select the different events so that these are received within a single code repetition interval ($\lambda_c/c$) at the receiver. Provided the user is within the convergence zone, the difference between the estimated time of arrival and the corresponding measurements will be less than ($\lambda_c/2c$) once an allowance is made for the satellite clock offsets. The common reception interval arrangement ensures that there is a unique correspondence between measured time of reception and the transmission time of the signal corresponding to the identified event in the code generator in the satellite.

One advantage of being able to select the arrival times so that they lie within a specific time interval is that it can help mitigate the errors due to receiver motion. The receiver is often subject to motion having two identifiable components. The first is due to the rotation of the Earth while the second is due to the (usually powered) motion of the receiver against the surface of the Earth. In the first case, the effects of this are automatically allowed for in the use of a coordinate system based on Earth Centred Earth Fixed (ECEF) frame. However, the effects of motion against the surface of the earth are not provided for in the ECEF framework.

If the velocity of the receiver is known, the motion of the receiver between the various times of reception of the event T shown in FIG. 2 can be compensated. Often, however, knowledge of receiver motion is not available except through using GPS measurements. In this case an alternative version of FIG. 2 can be constructed in which the measured arrival times of satellite events are arranged to lie in a window no larger in distance than $\pm\lambda_c/2$, or in time $\pm\lambda_c/2c$, where c is the speed of light. This is illustrated in FIG. 4. The benefit of a processing technique which minimizes the difference in signal event arrival times is that it tends to desensitise the location solution to receiver motion and biases in the receiver clock timescale since the receiver is in substantially the same position for each satellite's time of arrival measurements. In this case, the signals, which arrive during the allowed time window of $\pm\lambda_c/2c$ from different satellites, result from signalling events emitted at different times. The specific events will depend upon the integer component of the single difference residual corrected for single difference satellite clock bias. The effect of swapping a difference in arrival time for a difference in transmission time is to effectively exchange receiver velocity against the earth's surface for changes in the satellite position resolved along the line-of-sight between the satellite and the receiver. The result is an improvement is in the accuracy of the resulting location solution.

Using different transmission events introduces an extra complication in determining the positions of the satellites as these must be calculated using the correct respective transmission times of the different signalling events and not at a common GPS or absolute time.

However, it is still possible to obtain a solution if the location calculations do not include this correction for either measurement or transmission times or satellite location or a combination of both. The location determined using this strategy may incorporate a higher error than if the different transmission times had been accounted for. This error may be reduced in a second step, by employing an iterative process. For example, the first step of the iterative procedure might assume a common estimate of absolute time for the determination of the satellite locations to compute receiver location and improved estimates of absolute or GPS time. Later iterations might then use the different transmission times of the signalling events and the satellite position estimates for these times. This has a small but significant effect on the estimate of satellite location as GPS satellites typically move at an along-track velocity of approximately 4 meters/ms. Errors in transmission time of up to 10 ms can thus result in satellite line-of-sight position errors of up to 8 meters. This is sufficient to be a significant error source in the user's location solution.

FIG. 4 represents a series of time related events represented on an absolute (or GPS) time scale 415. In the figure, event (i-k) occurs at GPS time $t_i$ (401). The transmission of the events from satellite T is subject to a delay 402 in comparison with absolute (or GPS) time 401 resulting from the bias between the satellite clock or time reference and absolute time. Therefore, event (i-k) is actually transmitted at absolute time (403). FIG. 4 also shows the transition of event (i-k) to the receiver and its receipt at 413. The transmission of event T from the reference satellite is subject to a similar satellite clock synchronization error (or bias) except that, for illustrative purposes, the transmission time is an advance 404 in comparison with absolute time 405. As a result of this clock bias, event T is actually transmitted by the reference satellite at 406 and is received by the receiver at 410.

The time scale of FIG. 4 is marked in intervals of the repetition interval 407 for events of the same category as events '(i-k)' and T. One example of the events used is the code epoch emissions which can be derived in the receiver through the process of correlation with a replica code. The repetition interval corresponds to the time taken for light to travel over one event (e.g. code) wavelength.

The signal carrying event T from the reference satellite arrives at time 410 whilst the signals carrying events (i-k-2), (i-k-1) and (i-k) from satellite T arrive at times 408, 409 and 413 respectively. All of these events are indicative of a transit time. The arrival times of the signalling events are corrected for satellite clock offsets using information that is available in the ephemeris information. The corrected arrival time for event T from the reference satellite is 411 and the corrected arrival time for event (i-k) from satellite T is 412. The corrected arrival time for event (i-k-1) (which is not shown, but which is also a candidate for consideration) is at a time greater than $\pm\lambda_c/2c$ (time units) from the corrected reference event arrival and is consequently rejected. The single difference between the measured arrival times for events 'i' and (i-k) after correction for the satellite clock biases is shown at 417. Note that if the minimum single difference were formed before correction for the satellite clock biases, then event (i-k-1) would have been selected as the event from satellite T (409) resulting in the minimum single difference, since the uncorrected arrival time of event (i-k-1) is the closest of all the events received from satellite T to signalling event 'i' from the reference satellite. After correction for the satellite clock biases, event (i-k) becomes the event resulting in the minimum single difference. This illustrates the significance of using the satellite clock bias information in selecting the decision boundaries for the minimum range in the arrival times of the signalling events. This may improve the performance of the selection algorithm in determining the largest convergence zone.

The estimated arrival times are shown at 414 for the reference satellite and 418 for the arrival of event (i-k) from satellite 'j' after they have been corrected to account for the different transmission times of events 'i' and (i-k). The residual single difference in these 'a priori' estimated arrival times is shown at 416 after correction (subtraction) for the differences in transmission times of signalling events 'i' and (i-k).

The residual single difference time of arrival or range may be computed from the difference between the measured values after satellite clock bias correction (417) and the difference between the estimated times-of-arrival after event delay compensation (416).

Although FIG. 4 shows a residual being calculated based on the transmission of different events from the respective satellites, that residual is nonetheless still representative of a combined error in the expected times-of-arrivals of signals transmitted by the reference satellite and the 'j$^{th}$' satellite when compared with the actual times-of-arrival of those signals. The computation differs from that shown in FIG. 2, however, in that the absolute or GPS time of transmission is no longer eliminated. Preferably the appropriate delay compensation to account for the different transmission times is performed when forming the residual (using intervals 416 and 417).

As noted previously, it will be understood that the transmission delays or advances shown in FIGS. 2 and 4 are subject to the relative delay or advance of the clock in each of the satellites. For GPS C/A code transmissions, as an example, the delay or advance is not permitted to exceed 976.6 μsec. Other GNSS systems may have different permitted limits for the satellite clock excursions, for example Galileo satellites may exhibit a delay or advance as large as 40 ms. Any satellites can exhibit a delay or advance in accordance with their clock behaviour. It is not intended to be a requirement that any satellite has either a delay or advance. The clock biases shown in the figures are for the purposes of example only.

Figure 3:
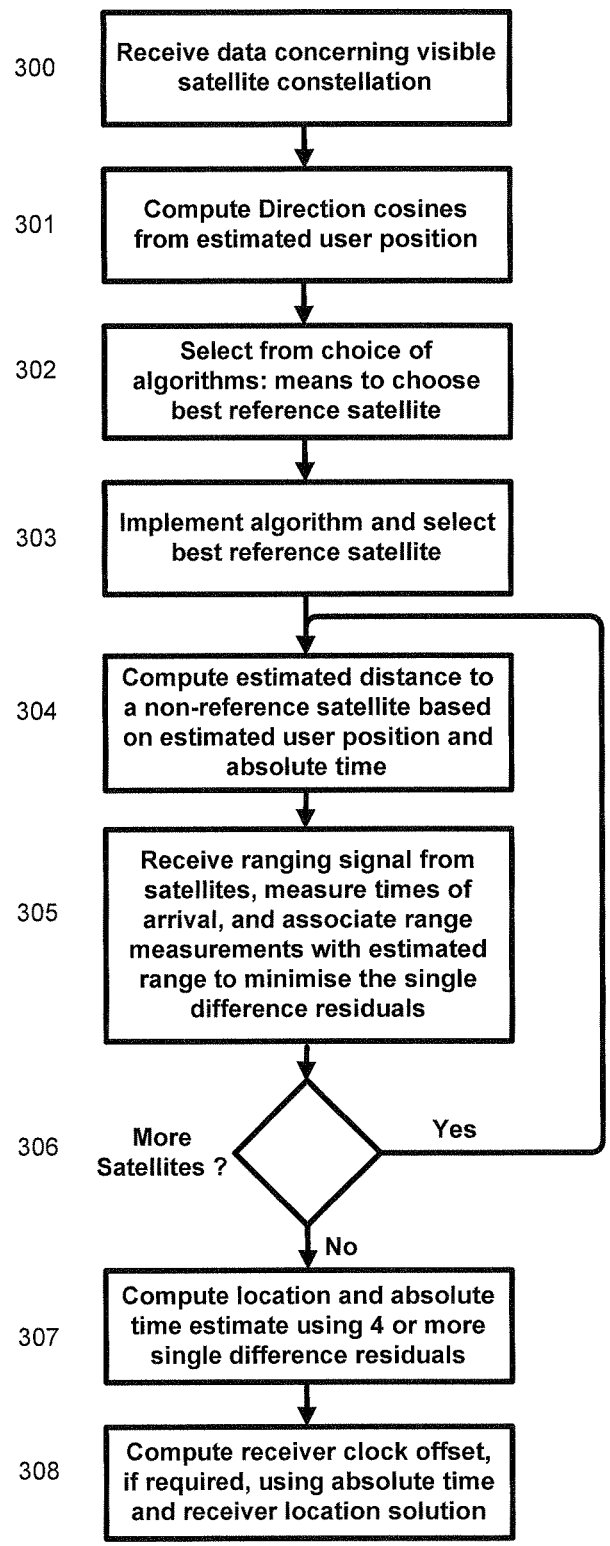
FIG. 3 shows the steps of a method that may be used to calculate the position of a GNSS receiver.
Figure 5:
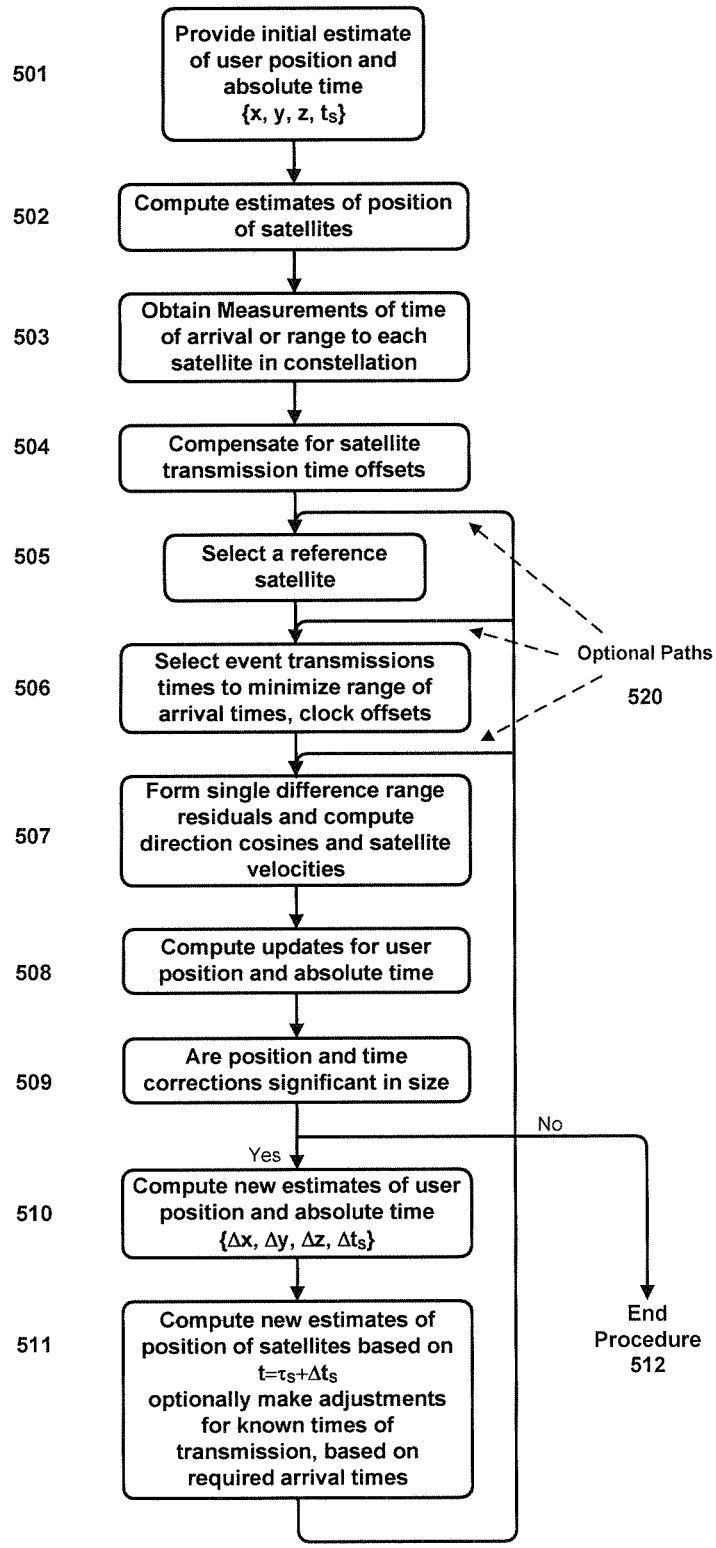
FIG. 5 shows the steps of an iterative method that may be used to calculate the position of a GNSS receiver.

FIG. 5 shows a similar method to that of FIG. 3 but with the process being performed iteratively and using signal events transmitted at different times (such as in FIG. 4). The method commences at step 501 with the provision of estimates of receiver position and GPS time. The parameters for satellite orbital models and satellite clock biases may be obtained by reading the broadcast satellite navigation data message or from a non-satellite source such as a terrestrial wireless source.

At step 502, the positions of the members of the satellite constellation or a subset, are computed using the GPS time estimate. The range of each satellite to the receiver can then also be estimated. At step 503, the receiver measures the ranging signal from each satellite, including the reference satellite. Corrections are applied for the satellite clock biases at step 504.

The process illustrated in FIG. 5 differs from that shown in FIG. 3 in that the reference satellite is selected only after the ranging signals have been received and compensated for transmission time offsets. The timing of the reference selection may be dependent on the algorithm used to select the best candidate for the reference satellite. In some scenarios it may be advantageous to select the reference after the ranging signals are received as the receipt of these signals can provide some valuable data on which to base the selection.

In step 506 the event transmission times are selected so as to minimize the range of arrival times, given the clock biases of the various satellites. In step 507, the single difference range residuals are formed from the measured times-of-arrival and estimated times-of-arrival. The direction cosines are computed. The satellite velocities are determined so that errors in the estimates in absolute time can be corrected through application of the methods and apparatus disclosed in this description.

In step 508 updated versions of the user position and absolute (GPS) time are computed. If those updates are not significantly different from the previous estimates (which in the first iteration will be the initial estimates) the procedure may come to an end in step 512. However, if the check performed in step 510 indicates that the updates were significant, the procedure may be repeated, through iteration, by computing new estimates for receiver position and absolute time (which may be formed by simply adding the updates to the initially estimated values) in step 510. In step 511, the positions of the satellites may be re-estimated based on the updated value of GPS time. The positions of the satellites may also be estimated by taking into account the differences in the transmission times, rather than assuming a common absolute time for the transmission of all relevant signalling events. The procedure may then return to step 505 for re-selection of the reference satellite.

Alternatively, as shown in FIG. 5, the procedure may iterate back to a later step in the procedure, such as steps 506 or 507.

As before, the sequence of steps shown in FIG. 5 may be applied in any suitable apparatus in communication with the receiver for obtaining the measured arrival times. The apparatus could be located in the same equipment as the receiver, in equipment adjacent to the receiver or in equipment remote from the receiver. It should be understood that FIG. 5 relates to just one possible embodiment of the invention and different sequences may be equally suitable for implementing the invention. In particular, the labelling of some paths as being 'optional' in FIG. 5 should not be taken to indicate that other paths illustrated in the figure are essential.

If the estimate of the range between the receiver and one of the satellites is too far from the correct value, this will often result in an incorrect location solution. Such failures may occur when the estimated user location and GPS time uses up most or all of the available uncertainty in one or more of the measurements, thereby resulting in an uncertainty that takes the calculation outside of the convergence zone. If the excess uncertainty is only small, a reversionary procedure may be used to find which range measurement is in error and substitute the correct value. This shows improved performance over a random search algorithm whereby every possible location and time in a known uncertainty volume are tested until a correct solution is found. In the prior art such tests are performed in an indiscriminate way, with no means to select which are the locations and time which offer the highest probability of success.

In the present disclosure, a reversionary method is established which may be progressively applied to regions with ever increasing uncertainty. The reversionary method involves identifying which of the original range estimates may have been the most likely to be in error through identifying one or more single-difference residuals that are larger than the others and adjusting those outlying residuals by $\lambda_c$. The reversionary method can be explained by way of a straightforward example in which all of the a priori measurement residuals (found by forming the single difference between estimated range from user location to estimated satellite location and the measured satellite to user range) are close to zero, except for one. In this example, the outlying residual is close to $\lambda_c/2$. If the sum of the squares of the a posteriori measurement residuals is large, a second location computation is formed after the large a priori residual is adjusted. The large a priori residual may be adjusted by adding or subtracting $\lambda_c$ (whichever will give an adjusted residual closest in magnitude to the original residual). Thus, this procedure selects the nearest-neighbour (in magnitude) ambiguity value to the original residual. If there is only one a priori residual that is significantly larger than the others, selecting an alternative (but larger) choice of residual will often provide a correct location and time solution. That correct solution will typically generate a low a posteriori sum of squares of the residuals.

This reversionary technique may also be used to expand the convergence zone, and this is described below.

The description above gives a general explanation of how the location of a GPS receiver can be determined under weak signal conditions without having to calculate the integer ambiguity in the measured arrival times. An example of how these principles might be applied in practice is described below.

Implementation Example

An example of how the single-difference method described above might be implemented in practice is described below. In this example, the location system is a GPS system and the receiver is only capable of decoding the C/A code in the received satellite signals. The signalling events detected by the receiver are thus code epochs, the time between repetitive signalling events is 1 ms and the receiver is able to determine times-of-arrival of the signalling events that are sub-one-millisecond. This is for the purposes of example only, as the algorithm described below is equally applicable to other satellite navigation systems and to scenarios in which the receiver is able to measure a greater or lesser portion of the transit time of the signalling event.

The underlying model for the timing of the GPS signals was given in equation (1), which is repeated below:

$$t_{rx,j} = t_{gps} + \frac{D_j(t)}{c} + \frac{(B_U - B_{SV,j})}{c} + \frac{(d_{iono,j} + d_{tropo,j})}{c} + \varepsilon_j \quad (1)$$

In which $t_{rx,j}$ is full time-of-arrival, measured against an absolute or relative GPS timescale, of the GPS signal transmitted by satellite j at the receiver. Equation (1) can be rewritten by splitting the full time-of-arrival into its integer and fractional components:

$$\tau_j + N_j = t_{gps} + \frac{D_j(t)}{c} + \frac{(B_U - B_{SV,j})}{c} + \frac{(d_{iono,j} + d_{tropo,j})}{c} + \varepsilon_j \quad (11)$$

where $\tau_j$ is the fractional, measured part of the time-of-arrival and $N_j$ is the unobserved integer part. The fractional, measured part of the time-of-arrival is indicative of the transit time of the signalling event, but that indication is ambiguous since the integer part of the transit time is unknown.

Correcting for the satellite clock biases, merging the small random atmospheric and measurement errors and rearranging the equation into terms that are known, or can be estimated, and the unknown terms gives the following:

$$\tilde{\tau}_j - \frac{\hat{D}_j(t_e)}{c} = -N_j + t_{gps} + \frac{B_U}{c} + \tilde{\varepsilon}_j \quad (12)$$

where:
$\tilde{\tau}_j$ is the fractional, observed time-of-arrival corrected for the $j^{th}$ satellite clock bias or offset;
$\hat{D}_j(t_e)$ is the estimated distance between the receiver and the $j^{th}$ satellite at estimated absolute (GPS) time $t_e$; and
$\tilde{\varepsilon}_j$ is a combined error representing the ionospheric, tropospheric and measurement errors.

Taking the difference with a reference satellite yields the following equation:

$$(\tilde{\tau}_j - \hat{D}_j(t_e)/c) - (\tilde{\tau}_0 - \hat{D}_0(t_e)/c) = -(N_j - N_0) + (\tilde{\varepsilon}_j - \tilde{\varepsilon}_0) \quad (13)$$

All of the terms on the left-hand side of equation (13) are known or can be estimated. The right-hand side of equation (13) is close to an integer millisecond since the errors are small. A modulo operation can be performed on both sides of equation (13) to remove the integer component as an unknown:

$$|(\tilde{\tau}_j - \hat{D}_j(t_e)/c) - (\tilde{\tau}_0 - \hat{D}_0(t_e)/c)|_{mod\ 1ms} = (\tilde{\varepsilon}_j - \tilde{\varepsilon}_0) \quad (14)$$

When evaluated with the estimated distances, rather than the true distances, correct elimination of the integer term should be achieved provided that:

$$|(D_j - \hat{D}_j(x_e, t_e)) - (D_0 - \hat{D}_0(x_e, t_e))| < 0.5\lambda_c \quad (15)$$

where $\lambda_c$ is the distance between repetitive signalling events and $x_e$ and $t_e$ are the initial estimates of user position and absolute time respectively.

The worst case scenario occurs when the $j^{th}$ satellite is on one horizon and the reference satellite is on the opposite horizon. In this scenario: $(D_j - \hat{D}_j(x_e, t_e)) = \pm 0.25\lambda_c$ and $(D_0 - \hat{D}_0(x_e, t_e)) = \pm 0.25\lambda_c$ and so the errors in $x_e$ and $t_e$ should result in range errors of less than $0.25\lambda_c$, or 75 km for GPS. This provides a worst-case scenario for the convergence zone. In practice, for satellites having realistic orbits and visibility this worst-case scenario rarely occurs. In fact for GPS, a convergence zone of around 100 km or more is achieved with around a 99% yield and a convergence zone of 186 km or more is achieved with around a 50% yield.

In practice, this means that the position of the GNSS receiver can be calculated using only the fractional times-of-arrival provided that the initial estimates of receiver position and absolute time are sufficiently close to their true values. Returning to matrix equation (6), which represents an example of how the position and time updates may be calculated, an example of how the procedure can be adapted to using a rounding technique will be explained.

$$\Delta x = \nabla H^{-1} \cdot \nabla r \quad (6)$$

The vector $\nabla r$ can be formed by first constructing a vector $\Delta t$. The vector $\Delta t$, in units of milliseconds, can be constructed as follows:

$$\Delta t_j = 1000 \times [(\tilde{\tau}_j - \hat{D}_j/c) - (\tilde{\tau}_0 - \hat{D}_0/c)] \quad (16)$$

Since $\tilde{\tau}_j$ are the measured, sub-$t_c$ portions of the times-of-arrival after correction for the satellite clock offsets or biases, there is a $t_c$ (1 millisecond for C/A code GPS signals) ambiguity in equation (16). The integer $t_c$ part is removed by performing a modulo operation and the result converted into meters.

$$\Delta t_j = \mathrm{mod}(\Delta t_j, 1) \quad (17)$$
$$\mathrm{if}\ (\Delta t_j > 0.5): \Delta t_j = \Delta t_j - 1$$
$$\Delta r_j = \frac{c}{1000} \Delta t_j$$

Once vector $\Delta r_j$ has been constructed equation (6) can be solved to compute the position and time updates. As before, equation (6) may be straightforwardly solved using standard techniques—for example, equation (8) is used to solve for over-determined least squares systems:

$$\Delta x = (\nabla H^T \cdot \nabla H)^{-1} \cdot \Delta H^T \cdot \nabla r \quad (8)$$

Therefore, although this version of the method requires a modulo operation, which is not required in the methods illustrated in FIGS. 2 and 4, it shares with those other versions the elimination of the receiver clock bias and the GPS time through referencing every time-of-arrival to that of a signal from a reference satellite. This eliminates the possibility that an inconvenient value for the receiver clock bias will lead to incorrect rounding of the integer ambiguities. The expected time-of-arrival of the signal from the '$j^{th}$' satellite is not directly determined in the way illustrated in FIGS. 2 and 4 but the expected times-of-arrival are nonetheless indicated by the D/c terms present in equation (14). Essentially, the modulo operation enables the fractional times-of-arrival (which should be the same for each event, 'i−1', 'i', 'i+1' etc received at the receiver), after correction for the satellite clock biases, to be used rather than having to directly determine full times-of-arrival. It is possible to use the modulo operation in this way because taking single-differences has eliminated the unknown receiver clock bias.

As mentioned above, if some estimates are considered to be more reliable than others then a diagonal weighting matrix can be used. A suitable matrix would be a matrix in which the diagonal elements are estimates of the reciprocals of measurement variance. The weighting may be applied as follows (weighted least squares solution):

$$\Delta x = (\nabla H^T \cdot W \cdot \nabla H)^{-1} \cdot \nabla H^T \cdot W \cdot \nabla r \quad (18)$$

Figure 6:
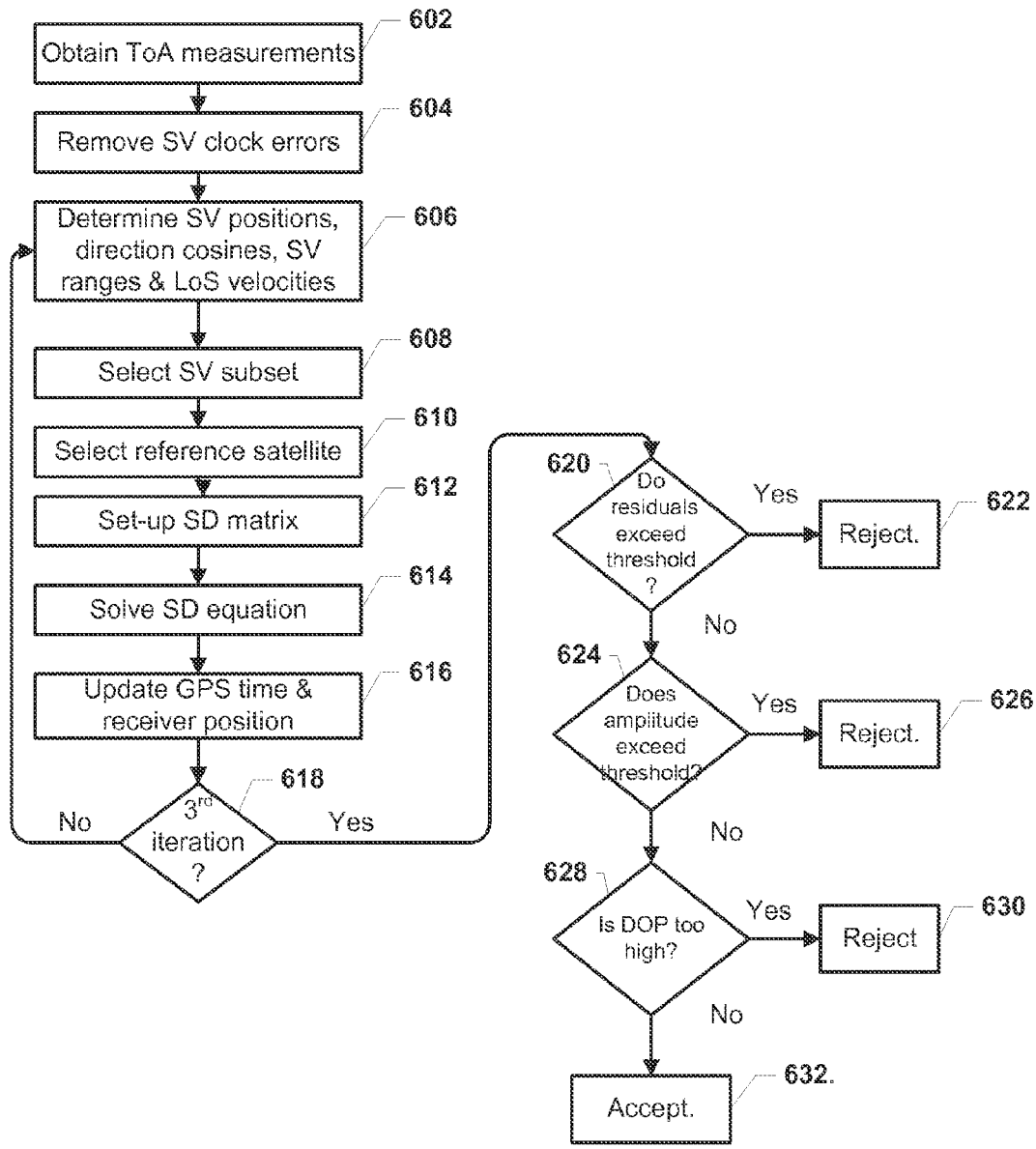
FIG. 6 shows the steps of a method that may be used to calculate the position of a GNSS receiver, which includes criteria on which the calculated location may be rejected.

Examples of steps that might be performed to compute the position of a GNSS receiver are shown in FIG. 6. In step 602, the time-of-arrival measurements are obtained. In step 604, the satellite clock errors are removed from these times-of-arrival. The following few steps may then be performed iteratively. Preferably three iterations are completed, although two iterations may often be sufficient to reach convergence. In step 606, the parameters required to set-up the matrices are determined, namely the satellite positions, the estimated ranges of the satellites, the direction cosines and the line-of-sight velocities of the satellites. In step 608, a subset of satellites is selected from the satellites in view of the receiver. This step may only be performed prior to the first iteration. In step 610, the reference satellite is selected. In step 612, the single-difference matrix is determined. In step 614, the single-difference equation is used to solve for an update to the receiver position and absolute time and in step 616 the previous estimates of absolute time and receiver position are updated. In step 618, it is checked whether this iteration is the third (or other such suitable number) iteration. If not, the process may return to step 606.

If sufficient iterations have been completed, the method may proceed to step 620, in which the residuals are checked to establish if any exceed a threshold. The residuals may be determined by computing:

$$\nabla H \cdot \Delta x - \nabla r \quad (19)$$

The residuals provide an indication of how well the initial over-determined solution is satisfied. If the residuals exceed the threshold, the position fix is rejected. The threshold for the residuals may suitably be 10 km.

The position fix is only rejected on the basis of the residuals exceeding a threshold if measurements were taken from more than five satellites, i.e. if the system is over-determined. If the system is not over-determined, then the equation is solved exactly (even if the answer may be wrong) and so the residuals are zero. Computing the residuals is effectively a way of using the extra equations in the over-determined system to check how good a fit the solution is. If the system is not over-determined, there are no extra equations and so that option is not available.

The position fix may then be subjected to two more integrity checks. In step 624, the update to the amplitude of the receiver position is checked (i.e. the z-component of the update vector) and, if that update exceeds a threshold, the position fix is rejected. Suitably the threshold may be set so that the position fix is rejected if the amplitude changes by more than 10 km from the previous estimate. Finally, the dilution-of-precision parameter (DOP) may be checked and, if it is excessively high, the position fix may be rejected. If the position fix passes all of these integrity checks, the position fix may finally be accepted in step 632.

Optionally the position fix obtained using the single-difference approach may be supplemented by a conventional GNSS calculation. For the conventional calculation, absolute time is assumed to be known from the single-difference calculation that has already been performed. The ambiguity in the measured arrival times may be resolved by calculating the integer values. Unlike at the outset, user position and absolute time are now known to a reasonable degree of accuracy from the preceding single-difference calculation and so the integer values can be calculated without the risk of incorrect rounding. The conventional location calculation then solves for receiver position and receiver clock bias using the usual 4×4, or 4×n, matrix formulation.

A conventional location calculation may be performed after the final iteration of the single-difference calculation and before the integrity checks (e.g. between steps 618 and 620 in FIG. 6). Incorporating a conventional location calculation into the method may improve the accuracy of the final position-fix. The calculation can also be used to improve the accuracy of the calculated Dilution of Precision (DOP) values, which is explained below.

DOP values and how they may be calculated are well-known in the art. DOP values represent the effect of satellite geometry on the precision of the position fix. The accuracy of the final position fix may be determined using e.g. HDOP, GDOP, TDOP which is time DOP. The DOP values may be based on the single-difference calculation (e.g. by using the single-difference matrix, ΔH). The DOP values may also be based on a standard location calculation (e.g. by using the standard observation matrix, H). However, basing the DOP values on either the single-difference calculation or a standard location calculation tends to underestimate the true DOP values. This is not necessarily a problem but it is possible to obtain a better estimate of the DOP values by returning to a 5×5 formulation so that the DOP values fit the receiver bias (rather than eliminating it by construction, as in the single-difference calculation). This may be achieved using the result from matrix algebra in which a column partition of an over-determined least squares problem yields a pseudo inverse that can be block partitioned.

The standard form for a linearized location calculation can be written as:

$$H \cdot \Delta x = r \quad (20)$$

$$\Delta x = \begin{bmatrix} \Delta x \\ \Delta y \\ \Delta z \\ B_U \end{bmatrix}$$

$$H = \begin{bmatrix} -n_{x1} & -n_{y1} & -n_{z3} & 1 \\ -n_{x2} & -n_{y2} & -n_{z3} & 1 \\ -n_{x3} & -n_{y3} & -n_{z3} & 1 \\ \vdots & \vdots & \vdots & \vdots \\ -n_{xN} & -n_{yN} & -n_{zN} & 1 \end{bmatrix}$$

where n are the unit direction vectors between the receiver and the various satellites.

Given the following block partitioning:

$$[H \quad \dot{p}] \begin{bmatrix} \Delta x \\ t_{gps} \end{bmatrix} = r \quad (21)$$

The pseudo-inverse requires the following inversion:

$$\begin{bmatrix} H^T H & H^T \dot{p} \\ \dot{p}^T H & \dot{p}^T \dot{p} \end{bmatrix}^{-1} = \quad (22)$$

$$\begin{bmatrix} (H^T P_{\dot{p}}^\perp H)^{-1} & (H^T P_{\dot{p}}^\perp H)^{-1} H^T \dot{p} (\dot{p}^T \dot{p})^{-1} \\ (\dot{p}^T P_{\dot{p}}^\perp \dot{p})^{-1} \dot{p}^T H (H^T H)^{-1} & (\dot{p}^T P_{\dot{p}}^\perp \dot{p})^{-1} \end{bmatrix}$$

where the projections P are defined by:

$$P_X^\perp = I - X(X^T X)^{-1} X^T \quad (23)$$

and I is the identity matrix.

If the standard location calculation has already been performed, H and $(H^T H)^{-1}$ will already have been calculated. The line-of-sight velocity vector will also be known as this forms part of the single-difference calculation. The DOP values are calculated using only the diagonal elements of the resultant. The DOP values can therefore be evaluated with a few matrix multiplications and a 4×4 matrix inversion.

Preferably H is expressed in local tangent plane coordinates for the calculation of the DOP values. This can be accomplished by rotating the coordinate system in either the geometry or resultant matrix by a matrix whose columns are an orthonormal set of unit vectors aligned to the local tangent plane.

Selection of the Reference Satellite

In a further aspect, one or more embodiments of the invention may implement a method for selecting the best available reference satellite. The selection procedure may be varied depending upon the computational resources available to the user and prior knowledge of the most significant error source.

There are several different metrics that might be used in the selection of an optimized choice for the 'reference' satellite and its measurement. One prior art approach is to select as a reference the satellite that is nearest the receiver's zenith (i.e. the satellite that has the highest elevation angle relative to the receiver's position). This corresponds to selecting the satellite with the minimum value of $|\dot{\rho}_0|$. This may not be optimum for a given constellation as it may, in one example, unbalance the truncation errors in establishing the integer numbers of code repetition wavelengths in the satellite to user distance. Furthermore, it does not consider any effects due to partitioning the available measurement errors into a portion allocated to absolute time errors and a separate portion due to user location errors. Such allocation is a desirable means to build 'a priori' knowledge concerning the sizes of the unknown parameters into the solution. This concept has not been mentioned or addressed previously.

A selection of algorithms that might be used to select the reference satellite, which may provide improved tolerance to user position and absolute time errors, are described below. The selection metrics used below are more responsive to the status of the complete satellite constellation rather than only using one feature of one satellite.

Minimizing Velocity Variation

One suitable metric for the selection of a best reference satellite involves minimizing the variation in satellite line-of-sight velocities from that of the reference satellite. For a constellation with N+1 members, a suitable metric is formed from the average of the differences between the line-of-sight velocities of each satellite and a reference satellite, where the subscript '0' refers to the reference satellite:

$$\upsilon \Big|_{min \ over \ selection \ of \ sat \ '0'} \equiv \frac{1}{(N+1)} \sum_{\substack{j=1 \\ j \neq 0}}^{N} (\dot{p}_j - \dot{p}_0) = \quad (24)$$

$$\frac{1}{(N+1)} \sum_{j=1}^{N} (\dot{p}_j) - \dot{p}_0 = \{\dot{p}_{ave} - \dot{p}_0\}$$

The re-arrangement above shows that this process is equivalent to forming the visible constellation average and subtracting the line-of-sight velocity of the chosen reference satellite. The process can be simply summarized as making the choice of the reference satellite based on having its line-of-sight velocity closest to the average of the visible constellation.

The metric in equation (24) has the beneficial effect of providing a reference satellite selection which follows the average of the line-of-sight satellite velocities. If the satellite constellation is evenly balanced with respect to the line-of-sight velocities, that is, the average LOS velocity is near zero, the best reference satellite is the satellite having the line-of-sight velocity closest to zero, corresponding to the selection of the satellite nearest to the receiver's zenith. However, few constellations have such characteristics and it is more likely that the constellation has an unbalanced line-of-sight velocity profile, which is not centred on zero. In such cases, the average line-of-sight velocity can be significantly different from zero. The best selection for the reference satellite is the one which has a line-of-sight velocity closest to the constellation average. The final line in equation (24) demonstrates the ease of finding the best satellite using this criterion. The metric works well for unbalanced constellations by minimizing the variations between the single difference satellite velocities used in equation (5).

Figure 7:
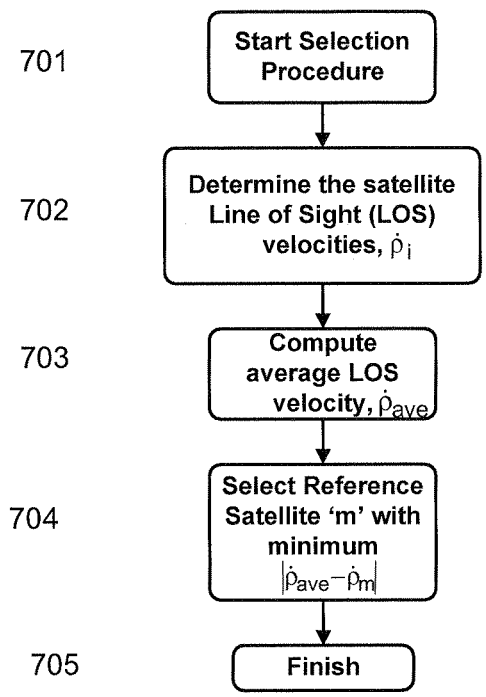
FIG. 7 shows the steps of a method that may be used to select a reference satellite.

One benefit of selecting the reference satellite to be the one having the closest line-of-sight velocity to an average velocity of the constellation is that it minimises that portion of the available error required to compensate for the error in the estimate of absolute time. This procedure is illustrated in FIG. 7.

Step 701 commences the procedure. In step 702, the line-of-sight velocities of the used constellation are determined from the estimate of absolute time, user location and the provided ephemeris information. In step 703, the average velocity of the constellation is computed. If this is significantly different from zero, it confirms that the constellation is unbalanced. In step 704, a search is made through the values of the satellite line-of-sight velocities to find that satellite (with subscript 'm') that has a line-of-sight velocity closest to the computed average value. The procedure concludes in step 705.

Figure 8:
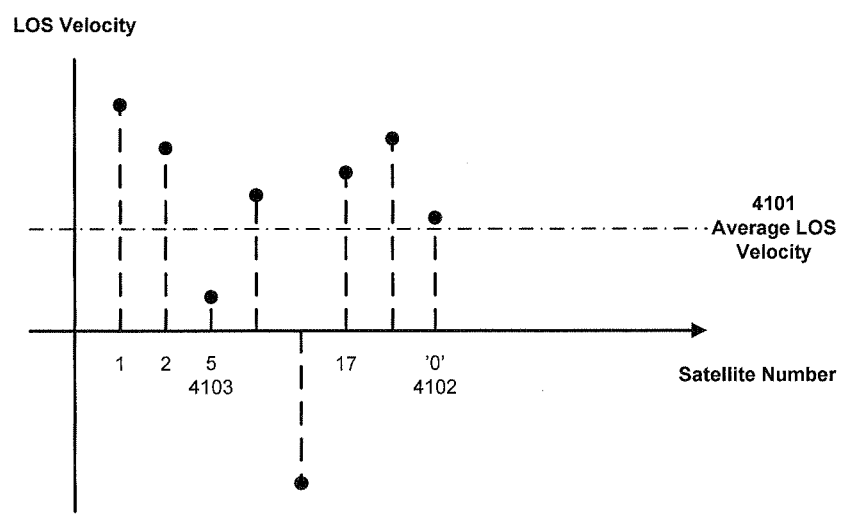
FIG. 8 shows the line-of-sight velocities of a satellite constellation.

A typical unbalanced satellite constellation and the best reference satellite within that constellation are illustrated in FIG. 8. Here the average line-of-sight velocity is illustrated as item 4101 and the satellite with the nearest velocity to this is 4102, marked as satellite number '0'. A selection of the reference satellite nearest to the receiver's zenith, that is, the one with the lowest line-of-sight velocity, would have resulted in the choice of satellite number 5 at 4103.

A second metric, for the determination of a best reference satellite selection, is formed by the sum of the norms (or a power of k of them) of the single difference line-of-sight velocities:

$$\left. \bar{v}^k \right|_{\text{min over selection } 0} \equiv \frac{1}{N} \sum_{\substack{j=1 \\ j \neq 0}}^{N} |(\dot{\rho}_j - \dot{\rho}_0)|^k \quad (25)$$

This equation also selects, as the reference satellite, the satellite that is in the middle of the velocity spread, but it places additional weight on the larger satellite to reference satellite velocity differences. This emphasis increases with the value of k.

A preferred embodiment takes a more general approach to the determination of a best reference satellite. In the following description, 'a priori' knowledge of the position and time estimation errors can be built into the selection method.

A Priori Knowledge of Position and Time Errors

An algorithm for selecting the reference satellite may beneficially incorporate a priori knowledge of the maximum errors likely to be present in the initial estimates of receiver position and GPS time. The maximum expected errors may be known from the source of the original estimates. For example, the original position estimate may have been selected to be the centre of a cell in a cellular network within which the GNSS receiver is known to be located. The maximum error in the original estimate of receiver position may then be determined from the size of that cell. Similarly, the original time estimate may have been obtained from a cellular base station's copy of an absolute time. Some networks, e.g. GSM, require each base station to be synchronised to GPS time within a maximum acceptable error. In such a scenario, the maximum error in the estimate of absolute time will also be known. The a priori knowledge of the maximum errors may be exploited, together with knowledge of the acceptable limits that are placed on initial errors that by the convergence zone for the location algorithm, to determine the most appropriate satellite to use as the reference.

The time of arrival of a signal from satellite 'j', emitted at absolute time, t, measured by the user receiver's clock, can be determined using equation (1), which is repeated below:

$$t_{rx,j} = t_{gps} + \frac{D_j(t)}{c} + \frac{(B_U - B_{SV,j})}{c} + \frac{(d_{iono,j} + d_{tropo,j})}{c} + \varepsilon_j \quad (1)$$

A variable, $\chi_j$, may be defined that is a calculated measure of absolute time, based on the reception time of an identified signalling event. The reception time of the signalling event is used to calculate absolute time by subtracting the transit time due to the range between user and satellite, correcting for the satellite clock bias. This estimate remains offset by the user receiver common bias, $B_U$, and certain measurement errors (ionospheric, tropospheric delays and noise). Thus $\chi_j$ is an absolute time, based on the transmission of the signalling event and on the scale of the receiver clock. The calculation should reveal the same value of absolute time for every satellite provided that the correct range measurement (to each satellite) is used, i.e. for all 'j' satellites and for the reference satellite. $\chi_0$ may be calculated as follows:

$$\chi_j = t_{rx,j} - \frac{D_j}{c} + \frac{B_{SV,j}}{c} \quad (26)$$

and $$\chi_0 = t_{rx,0} - \frac{D_0}{c} + \frac{B_{SV,0}}{c}$$

Single-differences may be constructed to remove the receiver bias and form an absolute time difference error, $\partial t_j$, between the $j^{th}$ satellite and the reference satellite:

$$\partial t_j = \left( \chi_j + \frac{B_U}{c} + \frac{(d_{iono,j} + d_{tropo,j})}{c} + \varepsilon_j \right) - \quad (27)$$
$$\left( \chi_0 + \frac{B_U}{c} + \frac{(d_{iono,0} + d_{tropo,0})}{c} + \varepsilon_0 \right)$$
$$= (\chi_j - \chi_0) - (\tilde{\varepsilon}_j - \tilde{\varepsilon}_0)$$

In equation (27), the user receiver common bias has been eliminated by subtraction, and the ionospheric and tropospheric delays have partially cancelled. The residual (ionospheric and tropospheric) delays are subsumed into the noise terms $\tilde{\varepsilon}$. Consequently, equation (26) should result in a nominal value for $\partial t_j$ of zero provided that the measurement errors are zero, with the additional condition that the values of $D_j$ and $D_0$ are correct.

An ideal reference satellite may be formed from a weighted combination of the $\chi$s for the visible constellation. The ideal reference may be the satellite having the property:

$$\chi_0 = \sum_{\substack{j \\ \text{visible} \\ \text{constellation}}} w_j \chi_j \quad (28)$$

subject to the constraint:

$$\Sigma w_j = 1 \quad (29)$$

The constraint ensures that the $B_U$ terms cancel in the expression fork.

Initial estimates, $\hat{\chi}_j$, of the $\chi_j$ values of may be based on:
(a) time of arrival measurements; and
(b) estimated (initial) values of the satellite to user range using estimated GPS time. The initial values of $\hat{\chi}_j$ are therefore unlikely to result in a zero $\partial \hat{t}_j$ since they each incorporate an error due to an error in receiver location and an error in satellite location (due to errors in absolute time).

A limit value $\partial \hat{t}_{max}$ can be placed on $\partial \hat{t}_j$ by considering the allowable error limits set by a rounding operation. A rounding operation should select the correct value for absolute time providing that $\partial \hat{t}_{max}$ is set at half the inter-event time interval (which is half of the difference between the ambiguous values). A convergence zone can be identified in which the estimated errors as defined by $\partial \hat{t}_j$ are all less than half the inter-event time interval (this interval is $\lambda_c/2c$, which for GPS C/A code is ½ ms).

In order to minimize the probability that any $\partial \hat{t}_j$ exceeds the limit, a reference satellite which is a function of some or all (for example, a form of average) of the $\partial \hat{t}_j$ values is preferably selected. One optimum choice for the reference satellite is to select as the reference the satellite that generates a minimum error. One suitable metric for determining this is the $L_2$ metric:

$$E = \sum_j \partial \hat{t}_j \text{ with } j \in 0 \ldots (N-1) \quad (30)$$

which yields:

$$\hat{\chi}_0 = \frac{1}{N} \sum_j \hat{\chi}_j \quad (31)$$

So a satellite corresponding to a mean of the $\chi_j$ values should minimise the least squares error. In reality, however, it is unlikely that a single one of the satellites will correspond exactly to the mean $\chi_j$ value. One embodiment option is to construct a virtual composite reference satellite, having a $\chi$ corresponding exactly to the mean value. This may not be a sensible option in practice because at this stage of the algorithm the times-of-arrival are still ambiguous. These ambiguities can be resolved once one of the satellites has been selected as the reference, either by selecting the most appropriate time-of-arrival relative to the reference satellite or by rounding once a comparison with the reference satellite has been performed (as has been explained above). However, if a composite satellite is formed by adding together N ambiguous terms, the result is ambiguous to $\Delta T/N$ (where $\Delta T$ is the inter-event interval). For example, if the ambiguities are [69 70 70 70 72] and $\Delta T$ is 1 millisecond, then the mean is 70.2, which is not an integer. This can be avoided by multiplying each equation in the geometry matrix by N but this causes a corresponding reduction in the convergence radius. It is therefore preferable to select an actual single reference satellite in order to avoid these problems and two examples of how this might be achieved are described below.

One preferred method of choosing the reference satellite can be understood by considering the rounding operation expressed by equation (14), which is repeated below:

$$|(\tilde{\tau}_j - \hat{D}_j(t)/c) - (\tilde{\tau}_0 \hat{D}_0(t)/c)|_{mod\ 1ms} = (\tilde{\epsilon}_j - \tilde{\epsilon}_0) \quad (14)$$

This equation holds true if the values of receiver position and absolute time are correct, so that $\hat{D}(t)$ and $\hat{D}_0(t)$ are the correct values. However, in practice there will be an error in the estimates of receiver position and absolute time. One of the steps in the method defines a new variable:

$$\eta_j = (\tilde{\tau}_j - \hat{D}_j(t)/c) \quad (32)$$

$$\Delta_{j0} = \eta_j - \eta_0 \quad (33)$$

As before, when any $\Delta_{j0}$ approaches ½ ms, in GPS, there is the risk of rounding to the incorrect millisecond, causing the algorithm to fail. One reason for such a failure may be due to the contribution of the error components. To minimize the chances of this, one possible approach is to choose the reference satellite so as to minimise the maximum value of $\Delta_{j0}$ for every given j.

The method provides correct solutions for the location solutions provided all of the $\Delta_{j0}$ are less than $\lambda_c/2c$ ($\lambda_c/2$ ms for GPS C/A code). As this threshold value is approached, the remaining errors in the measurement (such as ionospheric, tropospheric and measurement noise) produce a (usually small) region where there is a risk of an incorrect choice of integer ($\lambda_c/c$) in the signal transit time. The method minimizes this possibility through the process choosing the reference satellite which minimizes the maximum value of $\Delta_{j0}$ for every member or subset of members of the visible satellite constellation. The method includes the step, or equivalent, of forming a metric:

$$l = \min_j \max_0(|\eta_j - \eta_0|^2) \quad (34)$$

The method then selects the reference satellite "0" so that index l is that with the minimum value of the absolute squared residual. This can be calculated directly since the values needed to compute equation (34) are known. For example, a direct method tests each possible reference satellite in turn and computes the RMS spread (or maximum absolute residual) of the differenced measurements. The candidate with the minimum value of the maximum absolute residual may be selected as the reference satellite.

Figure 9:
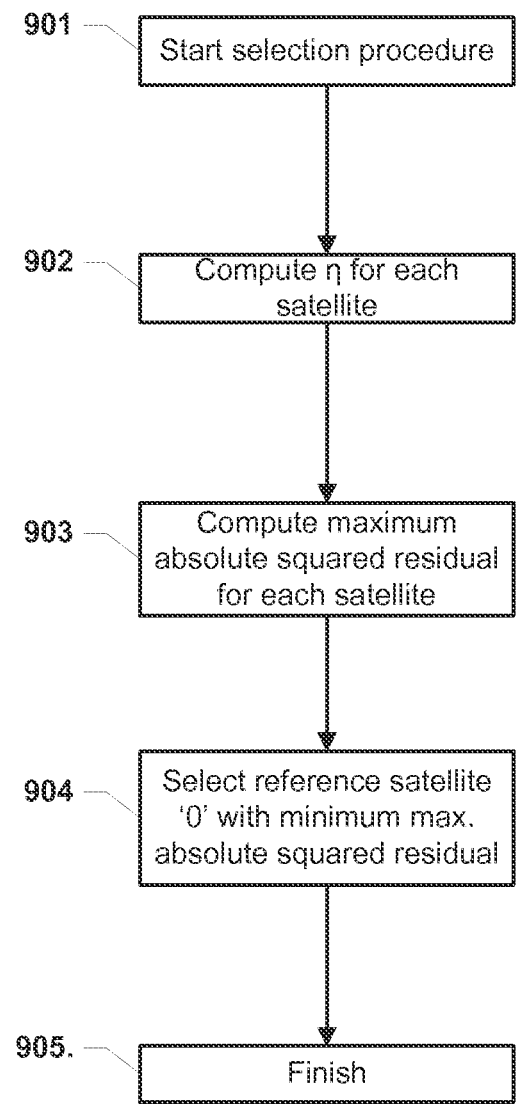
FIG. 9 shows the steps of a method for selecting a reference satellite in dependence on the absolute squared residuals.

An example of the steps that may be employed for selecting a reference satellite by means of the minimum absolute squared residual is shown in FIG. 9. The procedure starts in step 901. In step 902 a value $\eta_j$ is computed for each satellite using the measured arrival times, estimated ranges and known satellite clock offsets. In step 903 the maximum absolute squared residual is computed for each satellite by comparing its $\eta_j$ with the respective $\eta_j$ for each of the other satellites in accordance with equations 32 and 33. In step 904, the satellite for which the maximum absolute squared residual was the lowest is selected as the reference satellite. The procedure then terminates in step 905.

A second preferred method to select the reference satellite is to use the GPS Jacobian (observation matrix) to examine the make-up of the measure of GPS time, $\chi_j$. This can be done by looking at a single row of the matrix equation (since the $B_U$ terms are identical for a common receiver, and will be cancelled by taking single differences, this term can be set to zero in the equation below without loss of generality):

$$H \cdot \Delta x = r \quad (35)$$

$$[n_x^j \ n_y^j \ n_z^j \ \dot{\rho}_j] \begin{bmatrix} \Delta x \\ \Delta y \\ \Delta z \\ \Delta t \end{bmatrix} = n \cdot \Delta x + \frac{\partial \rho}{\partial t} \Delta t = \chi_j$$

Summing equation (35) over all of the j satellites in accordance with equation (31) gives:

$$\chi_{ref} = \bar{n} \cdot \Delta x + \frac{\partial \bar{\rho}}{\partial t} \Delta t \quad (36)$$

where the bar denotes average value.

Equation (36) demonstrates that the 'mean satellite' can be defined by a linear combination of the average unit vector to the satellites and the average line-of-sight velocity, the combination being performed in dependence on the errors in the initial estimates of receiver position and GPS time. One option is to select the satellite whose line-of-sight velocity is closest to the average line-of-sight velocity. This option may be appropriate if time is the dominant error factor. This provides additional confirmation that the satellite having the closest line-of-sight velocity to the average line-of-sight velocity of the satellite constellation (as shown in FIGS. 7 and 8) is an appropriate candidate for the reference satellite. Another option is to select as the reference satellite the satellite that is closest to the mean vector of the satellite's positions (i.e. the satellite whose vector position generates the smallest dot product with the mean vector position). This option may be appropriate if receiver position uncertainty is the main error factor. The steps involved in selecting the reference satellite to be the satellite whose vector position is closest to the constellation average are shown in FIG. 10.

Figure 10:
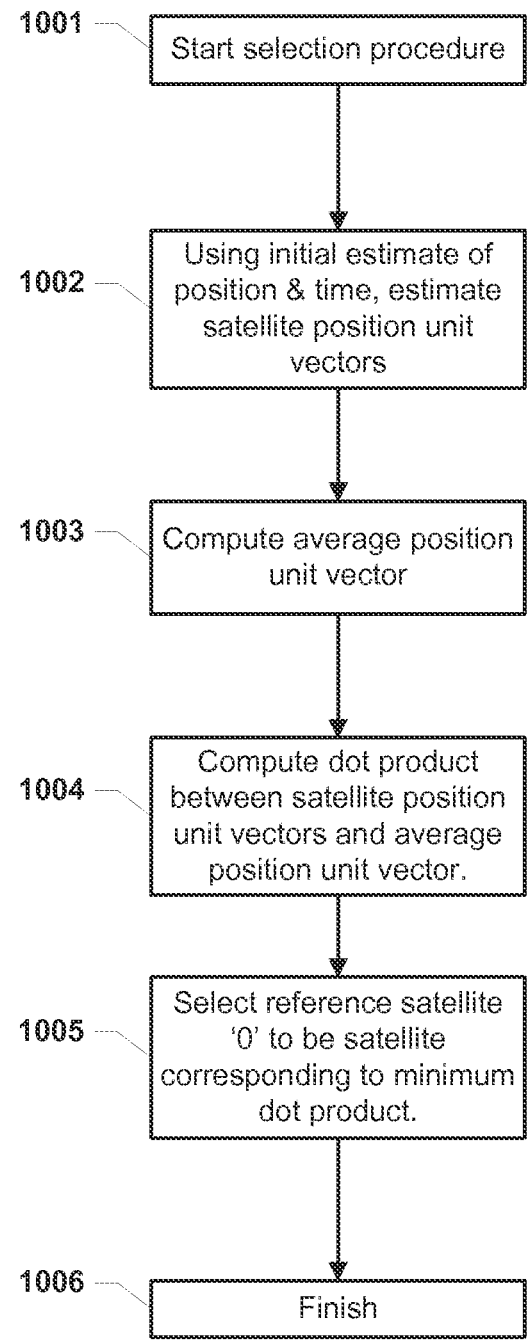
FIG. 10 shows the steps of a method for selecting a reference satellite in dependence on the average position vector of the satellites.

The procedure shown in FIG. 10 commences at step 1001. In step 1002 the satellite position vectors (which may suitably be the unit vectors from the receiver to each of the satellites, as shown in equation (36)) are determined. In step 1003, the average position vector is computed. In step 1004, dot products between the average position vector and each of the satellite position vectors are computed. The minimum of these dot products is determined and the satellite that generated that dot product selected as the reference satellite in step 1005. The procedure finishes in step 1006.

The general case where the errors are mixed is more complex but may be addressed by defining the following sets:

$$\Delta x(\phi) = |R_{MAX}|(a\cos\phi + b\sin\phi)$$

$$\Delta t = \Delta t_{MAX} \quad (37)$$

where:
a and b are any unit vectors in the receiver's local tangent plane;
a cos φ+b sin φ defines a unit vector in the 'ab' plane at an angle φ to the a unit vector;
$R_{MAX}$ is the maximum expected receiver position error; and
$\Delta t_{MAX}$ is the maximum expected error in the original estimate of GPS time.

The maximum expected errors may be known from the source of the original estimates. For example, the original position estimate may have been selected to be the centre of a cell in a cellular network within which the GPS receiver is known to be located. The maximum error in the original estimate of receiver position may then be determined from the size of that cell. Similarly, the original time estimate may have been obtained from a cellular base station's copy of absolute or GPS time. Some networks, e.g. CDMA require each base station to be synchronised to GPS time within a maximum acceptable error. In such a scenario the maximum error for GPS time will also be known.

$$\Delta_j(\phi) = |R_{MAX}|(\underline{a}\cos\phi + \underline{b}\sin\phi)\cdot(\overline{n} - n_j) + \left|\frac{\partial \overline{\rho}}{\partial t} - \frac{\partial \rho_j}{\partial t}\right||\Delta t_{MAX}| \quad (38)$$

Then:

$$\Delta_j{}^2 = \int \Delta_j{}^2(\phi) d\phi \quad (39)$$

And:

$$\Delta_j^2 = \quad (40)$$

$$[|R_{MAX}|\underline{a}\cdot(\overline{n} - n_j)]^2 + [|R_{MAX}|\underline{b}\cdot(\overline{n} - n_j)]^2 + \left[|\Delta t_{MAX}|\left|\frac{\partial \overline{\rho}}{\partial t} - \frac{\partial \rho_j}{\partial t}\right|\right]^2$$

Where:
$\overline{n}$ is a mean of the unit vectors between the receiver and the satellite;
$n_j$ is the unit vector between the receiver and the 'j$^{th}$' satellite;

$$\frac{\partial \overline{\rho}}{\partial t}$$

is the average line-of-sight velocity of the satellites; and $$\frac{\partial \rho_j}{\partial t}$$

is the line-of-sight velocity of the 'j$^{th}$' satellite.

The resultant choice of satellite for the reference is that with the smallest $\Delta_j^2$.

Figure 11:
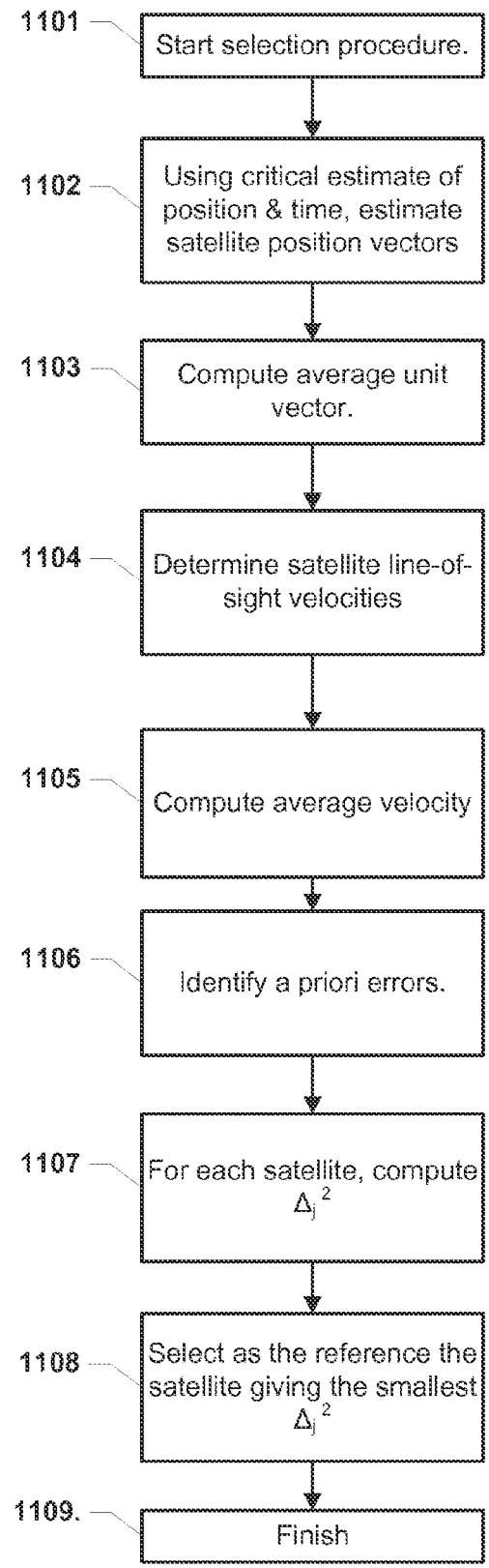
FIG. 11 shows the steps of a method for selecting a reference satellite in dependence on a metric based on an average position vector and an average velocity vector.

An example of a method suitable for selecting a reference satellite in the case where the errors are distributed between the original estimate of receiver position and the original estimate of absolute time is illustrated in FIG. 11. The procedure commences in step 1101. In step 1102 the unit vectors between the receiver and each of the satellites are determined. In step 1103, the average unit vector is computed. In steps 1104 and 1105, the satellite line-of-sight velocities are determined and the average line-of-sight velocity is computed. The a priori errors in the initial estimates of receiver position and absolute time are identified in step 1106. In step 1107, $\Delta_j^2$ is calculated for each satellite in accordance with equation (40), depending on which metric is being used. The satellite producing the smallest value for $\Delta_j^2$ is then selected as the reference in step 1108. The procedure finishes in step 1109.

The metrics given above are examples of suitable values that might be calculated in order to distinguish between different satellites on the basis of the a priori errors. These specific metrics are given for the purpose of example only, and it should be understood that other metrics might be equally suitable for evaluating how different choices for the reference satellite affect the susceptibility of the method to the a priori errors. An example is the selection of the reference satellite in a scenario when the errors are mixed between position and time errors, when it is equally suitable to select as the reference the satellite which minimizes the average error (see equation 39) or that which minimizes the maximum error (see below).

In order to minimize the maximum error, equations 38 to 40 may be replaced by the following alternatives:

$$\Delta_{j0}(\phi) = |R_{MAX}|(\underline{a}\cos\phi + \underline{b}\sin\phi)\cdot(n_0 - n_j) + \left|\frac{\partial \rho_0}{\partial t} - \frac{\partial \rho_j}{\partial t}\right||\Delta t_{MAX}| \quad (41)$$

Then:

$$\Delta_{j0}{}^2 = \int \Delta_j{}^2(\phi) d\phi \quad (42)$$

And:

$$\Delta_{j0}^2 = [|R_{MAX}|\underline{a}\cdot(n_j - n_0)]^2 + \quad (43)$$

$$[|R_{MAX}|\underline{b}\cdot(n_j - n_0)]^2 + \left[|\Delta t_{MAX}|\left|\frac{\partial \rho_j}{\partial t} - \frac{\partial \rho_0}{\partial t}\right|\right]^2$$

Where:
$n_0$ is a unit vector between the receiver and the satellite that is being tested as the reference; and $$\frac{\partial \rho_0}{\partial t}$$

is the line-of-sight velocity of the satellite that is being tested as the reference.

In this procedure we evaluate:

$$k = \min_0 \max_j (\Delta_{j0}^2) \quad (44)$$

So, each satellite is tested in turn for its suitability as the reference satellite by evaluating $\Delta_{j0}^2$ for that satellite as the reference in respect of all other satellites 'j' in the set. For each satellite being tested as the reference, the maximum expected error is then determined from these calculated $\Delta_{j0}^2$ values. The reference satellite that has the smallest of the estimated 'worst-case' errors, as indicated by the $\Delta_{j0}^2$ values, is then selected as the reference.

Figure 12:
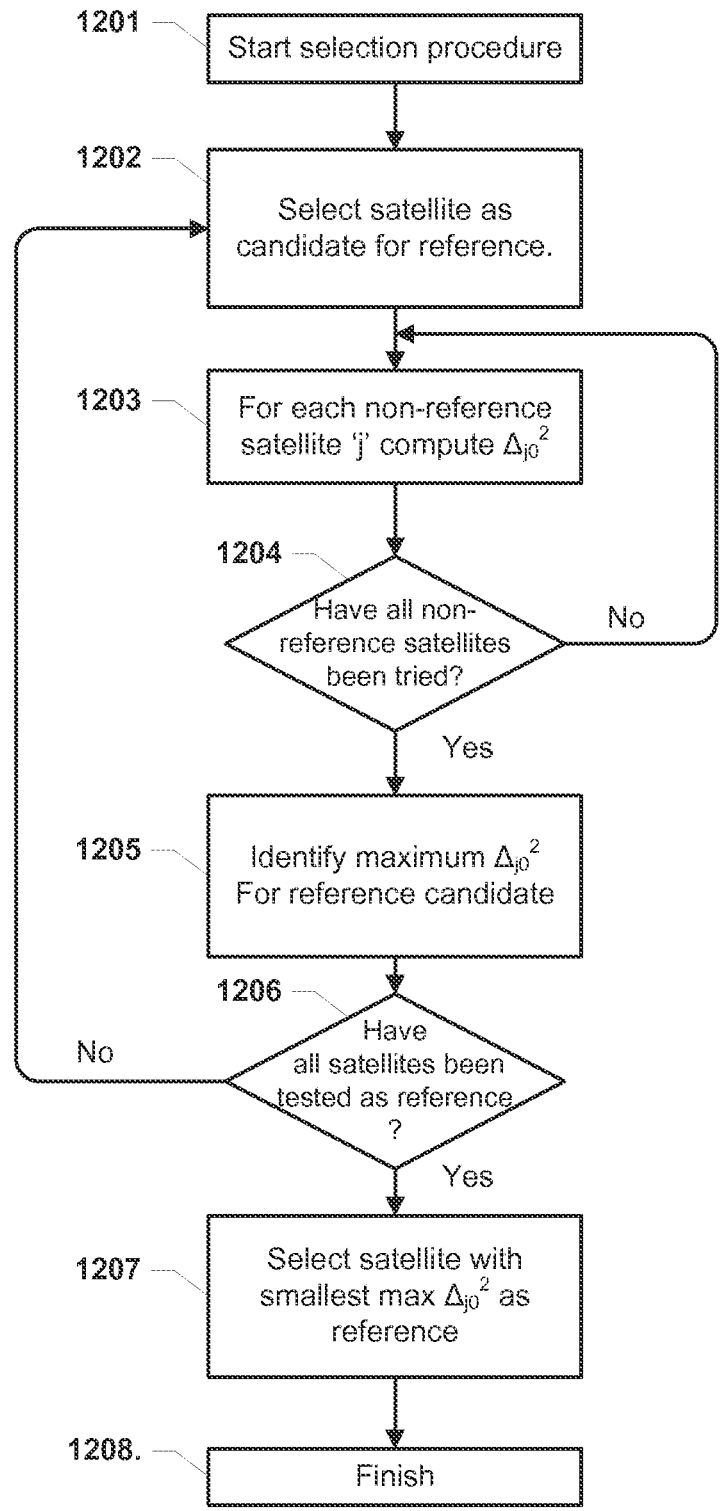
FIG. 12 shows the steps of a method for selecting a reference satellite in dependence on a metric.

This procedure is illustrated in FIG. 12. The procedure commences in step 1201. In step 1202 a satellite is selected as a candidate for the reference satellite. With all the other satellites as non-reference 'j' satellites, $\Delta_{j0}^2$ is then evaluated for this candidate as the reference (1203) until all non-reference satellites have been evaluated (1204). Once all non-reference satellites have been evaluated, the maximum of all the $\Delta_{j0}^2$ values for the reference candidate is evaluated (1205). This process is repeated until all available satellites have been evaluated as candidates for the reference (1206). The minimum of all the maximum $\Delta_{j0}^2$ values is then identified and the satellite that generated that minimum $\Delta_{j0}^2$ value as a reference candidate is selected as the reference (1207). The procedure finishes in step 1208.

Figure 13:
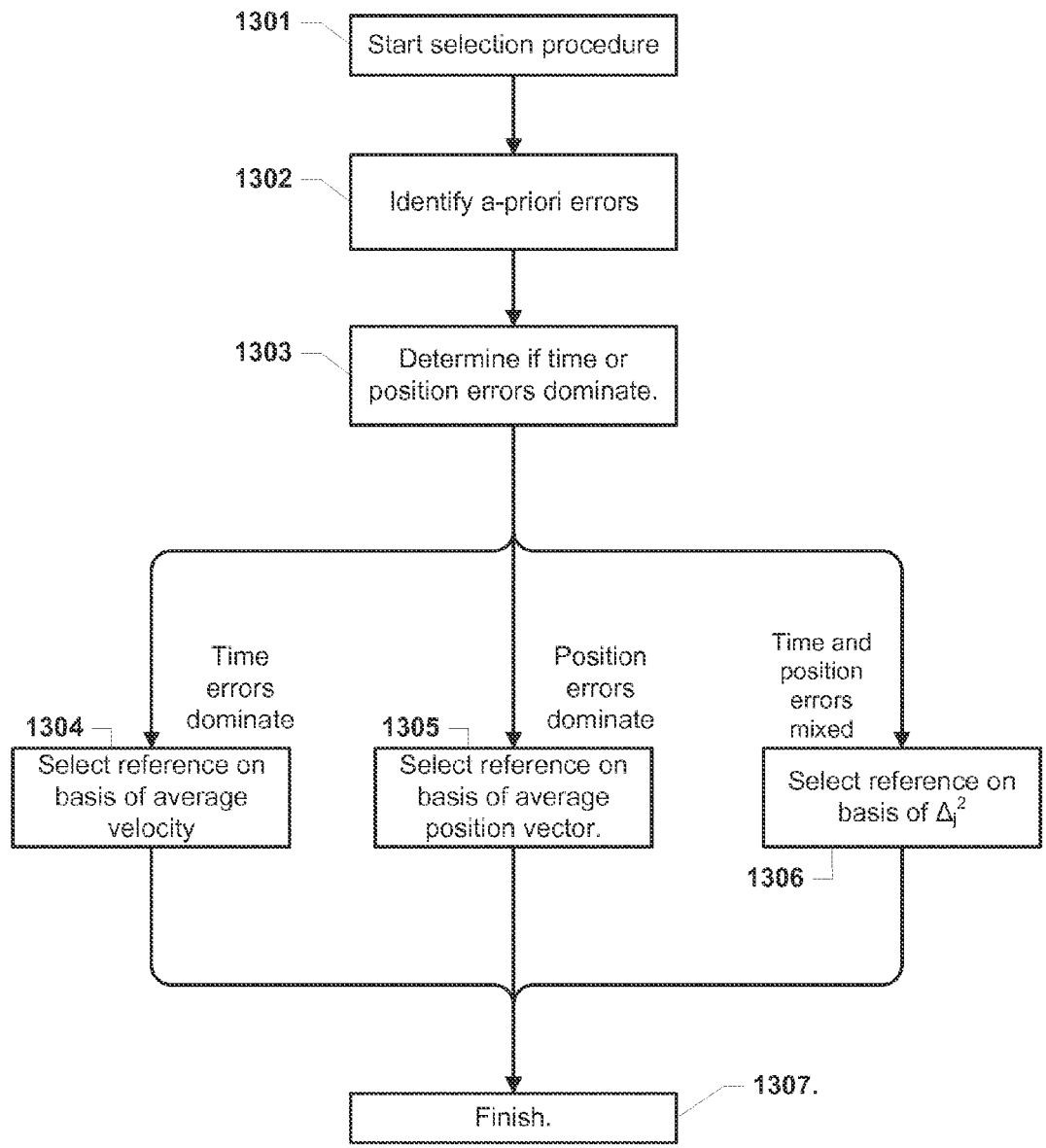
FIG. 13 shows the steps of a method for selecting a reference satellite-selection method in dependence on whether time or position errors dominate.

The exact method used to select the reference satellite may be chosen in dependence on the a priori errors associated with the original estimates of receiver position and absolute time, as shown in FIG. 13. If one or other of the error sources dominates (e.g. if either position or time account for 80% or higher of the total a priori error) then the reference satellite may be selected solely on the basis of the average position vector or the average line-of-sight velocity (see steps 1303 to 1305). However, if neither form of error dominates, so that both the initial receiver position estimate and absolute time estimate make a contribution to the overall error (which is likely to be the case in practice) then the reference satellite selection is preferably made by considering both error sources, e.g. by calculating values of $\Delta_j^2$ for each satellite.

Measurement Noise Correlation

The use of a reference satellite in the single difference method causes correlations between the measurements. The measurement noise correlation matrix for the single difference method is the sum of a diagonal matrix and a matrix in which every element is 1. The diagonal elements of the first matrix are the noise variances for each measurement. The second matrix may be multiplied by the variance for the reference satellite. Because the reference satellite has an impact on all the measurements, it is prudent to choose the satellite with the minimum measurement noise for the last iteration of the single difference method. This minimizes the impact of the reference satellite on the position accuracy and does not impact the convergence zone.

Convergence Zone

The convergence zone may be defined by the outer limits of the errors in estimated position and time that the algorithm is able to tolerate whilst providing a correct solution for position and time. The allowed measurement and modelling errors (of $\lambda_c/2$ in distance) can be partitioned between errors in GPS time (causing satellite location errors) and errors in the estimate of receiver location (normally expected to be along or in the local tangent plane). The receiver location error may be denoted as $R_{RX}$, which is in a different direction to the satellite from the actual receiver location. As measurements are made along the line-of-sight to the satellite, the total resolved error along the line-of-sight between the receiver and the satellite is:

$$\varepsilon_{LOS,j} = \dot{\rho}_j t_s + R_{RX} \cos(\phi_j) \le \frac{\lambda_c}{2} \quad (45)$$

where $\phi_j$ is the angle between the receiver location error vector and the line-of-sight to the satellite and $t_s$ is the error in the estimate of absolute time.

Figure 14:
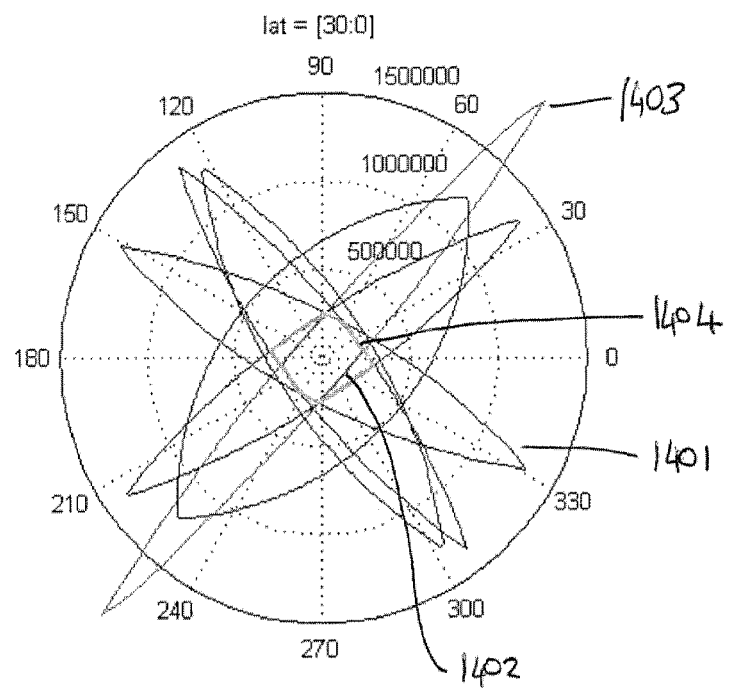
FIG. 14 shows the convergence zones in a six-satellite constellation.

Thus for a maximum permitted value of $t_s$, the allowable receiver position error depends upon the angle $\phi_j$. For each satellite the locus of points on the surface of the Earth for which the inequality of equation (45) holds as an equality (and allowing for both positive and negative errors) draws out a curve similar to an ellipse with the semi-minor axis aligned with the LOS to the satellite. These curves are thus not aligned with each other but to the direction of the satellite. Examples of such curves are illustrated in FIG. 14 (see e.g. curve 1401).

The maximum value of the semi-minor axis of one of these curves is:

$$R_{RX,min} \le \frac{\left(\frac{\lambda_c}{2} - |\dot{\rho}_j| t_{s,max}\right)}{\cos\beta_j} \quad (46)$$

where $\beta_j$ is the angle of elevation for satellite j.

The minimum permitted user position error is therefore inversely proportional to $\cos \beta_j$, which means that the permitted user position error is larger for satellites with larger elevation angles. The size of the maximum convergence zone is determined by the minimum area, bounded by the ±maximum resolved lateral error due to each satellite, which is inscribed on the receiver's local tangent plane (see equation (46)). Referring to FIG. 14, the maximum convergence zone is the smallest area 1402 inscribed by the satellite curves.

The derivation of equation (46) is a simplified method that involves linearization and discounts the curvature of the Earth. These approximations may not be used in more complex derivations.

Convergence Zone Extension Through Satellite Subset Selection

The exact method used to select the satellite subset may be chosen in dependence on the a priori errors associated with the original estimates of receiver position and absolute time. In particular, the method might be selected in dependence on a relative division in the overall error between receiver location and absolute time.

One of the estimates may be considered to dominate the error if, for example, either position or time account for 80% or higher of the total a priori error. If time errors dominate, then the satellites may be selected in dependence on the line-of-sight velocities of the visible satellites. If position errors dominate, then the satellites may be selected in dependence on the elevation angles of the visible satellites. If neither estimate dominates the errors, then the satellites may be selected in dependence on convergence zones associated with the visible satellites.

An error in the estimate of absolute time impacts the estimated range between the receiver and the satellite by placing the satellite in the wrong position in the sky. The size of the error in the resulting range estimate is dependent both on the error in the estimate of absolute time and the line-of-sight velocity of the satellite. Therefore, if the uncertainty in the a priori estimates is principally in absolute time, the minimum number of satellites having the smallest line-of-sight velocities is preferably used to calculate the receiver's location.

If the error in the a priori estimates is principally in receiver position, a different approach may be taken. A consequence of equation (46), above, is that the permitted receiver position error is larger for satellites with larger elevation angles. Therefore, a straightforward option for selecting a subset of satellites for the location computation is to select the visible satellites having the largest elevation angles relative to the receiver.

A further alternative is to select a subset of satellites by determining the convergence zone limits associated with each satellite in the visible set. The number of different combinations that would have to be tried to obtain an optimum subset of satellites from a particular visible constellation is easily determined. For users with a visible or useable constellation of N satellites and a required subset of only k satellites, the number of different choices is $^{N}C_k$ as each satellite has a distinct location. For large constellations and a minimum number of five satellites for the initial position determination, the number of possible constellation subsets is very large. For example, with ten visible satellites, the number of subsets is 10!/5!×5!, which is 252. This number is sufficiently large for it to be computationally burdensome to search all possible selections to find the one with the largest convergence zone.

A preferred option is therefore to maximise the convergence zone for a specific constellation through repeatedly rejecting the satellite that inscribes the smallest convergence zone around the receiver until only five satellites remain (or however many satellites are required in the subset). Selection based on the progressive elimination of the satellite with the closest ambiguity limit can also dramatically reduce the computational burden. When only the minimum set of satellites remains, the resulting convergence zone should be the largest possible based on the available ambiguity limit. This can be demonstrated with reference to FIG. 14, which shows the convergence zone 1402 of a six-satellite constellation. The satellite that inscribes the smallest convergence zone is represented by curve 1403. By removing this satellite from consideration, the convergence zone can be extended from region 1402 to region 1404. The remaining five satellites are a suitable subset for maximising the convergence zone.

It is easily observed, from FIG. 14, that there is a tendency for the convergence zone to become smaller as the number of satellites in the visible constellation is increased. Therefore, during the first iteration, when a priori errors are likely to be at their maximum, a preferred approach is to calculate the location of the receiver using measurements from the minimum number of satellites needed to obtain a solution. Typically the minimum number is five for situations in which the receiver has been unable to decode absolute time information from the satellite signals. However, if an additional constraint is placed upon the algorithm (e.g. by fixing the receiver's height), then the location algorithm might require fewer than five satellites. Additional satellites may be introduced for later iterations.

The location solution obtained using a satellite subset selected to maximise the convergence zone will typically have the largest possible error tolerance for receiver position errors. However, a subset selected to maximise the convergence zone may often have poor dilution of precision and so the sensitivity to measurement errors will be relatively high. During an early iteration of the algorithm, the measurement errors will be small compared to the receiver position error. Therefore, a subset that maximizes the convergence zone at the expense of sensitivity to measurement errors may be advantageously utilized, to be replaced during later iterations by a set of satellites with lower sensitivity to measurement errors. Later iterations may be seeded with the revised estimates of either location or absolute time or with both the revised estimates of location and absolute time. Since revised estimates will be closer to the receiver's actual position and/or actual absolute time than the original estimates, the convergence zone limits are not as crucial during later iterations. This procedure is a generalized extension of the iteration processes described earlier and does not introduce any measurements other than those taken at the start of the location determination process.

Figure 15:
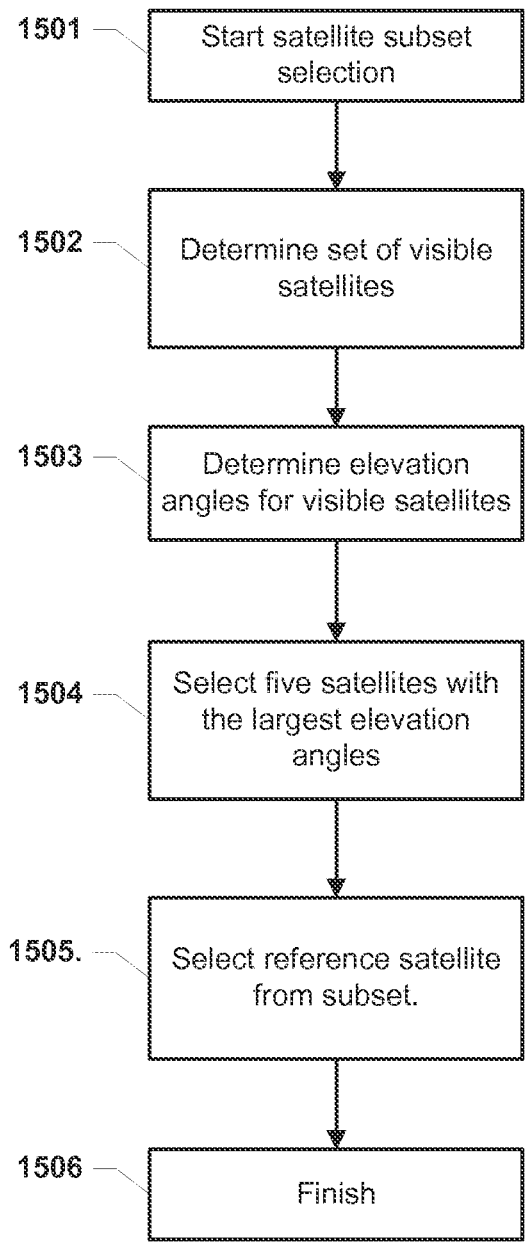
FIG. 15 shows the steps of selecting a satellite subset in dependence on elevation angle.

An example of satellite subset selection is illustrated in FIG. 15. The algorithm starts in step 1501. In step 1502, the set of visible satellites is determined. In step 1503, the elevation angle from the receiver to each of the satellites in the visible set is determined. In step 1504, the five satellites having the largest elevation angle are selected as the satellite subset. In step 1505, the reference satellite is selected from the subset. The process then terminates in 1506.

The Dilution of Precision (DOP) for the constellation selected by means of the process of FIG. 15 will tend to be poor, as the satellites are likely to be grouped together. This does not typically damage the algorithm to find the receiver's location and absolute time, however, since a subset having a better DOP may be used for later iterations. This suggests a modification to the process shown in FIG. 15.

During the first iteration, a subset of satellites may be chosen by selecting those satellites having the largest elevation angles at the estimated user position (as illustrated in FIG. 15). During a second iteration, all the visible satellite signal measurements above the receiver's elevation mask angle may be used rather than just a subset of those measurements. A new reference satellite may be chosen and one of procedures described above, normally using a least squares method, may be employed with the revised absolute time and estimate of user location to form a high precision solution for GPS time and user location. The first (coarse) estimation has a relatively high inaccuracy but also a large convergence zone. In the second iteration, a large convergence zone is not required as estimates of user location and absolute time have been determined from the first iteration with sufficient accuracy to fall within the convergence zone associated with the complete satellite constellation. In the second estimation, the Dilution of Precision is reduced due to the inclusion of satellites with lower elevation angles. The resulting solution accuracy is thereby improved.

Convergence Zone Extension Though Reversionary Techniques

The reversionary technique described earlier, in which large residuals are replaced by their nearest-neighbour ambiguity values, can be extended more generally not just to correct for measurement errors but expressly for the purpose of extending the zone of convergence. An example of this is provided in FIG. 16 for a six-satellite constellation. The dotted lines (e.g. 1601) are the contours at which each satellite measurement approaches its $\pm\lambda_c/2$ uncertainty limit projected onto the receiver's local tangent plane. By comparison, the solid contour lines (e.g. 1602) represent the $\pm 3\lambda_c/2$ satellite measurement projected onto the receiver's local tangent plane. As can be seen from the largest inscribed polygons, the area of the convergence zone is extended by a factor of nearly ten by including the residuals represented by these additional integer ambiguities.

With this method, the computation burden grows with the number of location solutions to be tested. With each satellite measurement, there are 3 possible measurement residuals to be tested in a range of $\pm 3\lambda_c/2$. Consequently, for N satellites, there is a maximum number of $3^N$ such test computations. However, in any specific case not all of these test computations are required, as the crossing of a single dotted line away from the centre corresponds to testing a single additional ambiguity. Furthermore, differencing with the reference satellite, which is equivalent to adding a constant to the vector, also results in fewer computations being required.

Computational Load

The computational load of the above-described methods will typically be dominated by the calculation of the satellite position using the ephemeris information. This is common to all GPS calculations. The various single-difference methods described above are not themselves computationally burdensome. A typical computation might require the solving of one 4×4 least squares pseudo-inverse per iteration. The standard GPS calculation that may be performed at the end of the process may also include a 4×4 pseudo-inverse. The DoP calculation may require a further 4×4 matrix inversion and a few matrix multiplications. This gives a total of approximately five 4×4 pseudo-inversions. Existing methods for calculating GPS position in the absence of GPS time typically use three 5×5 matrix pseudo-inversions. Although the number of inversions required in a typical single-difference computation is higher, the computational load is generally lower, since the computational load scales cubically with the dimensions of the matrix. The computational load associated with performing satellite subset and reference satellite selection is typically negligible and so the algorithm as a whole is easily within the capabilities of a modern microprocessor.

Apparatus Example

Figure 17:
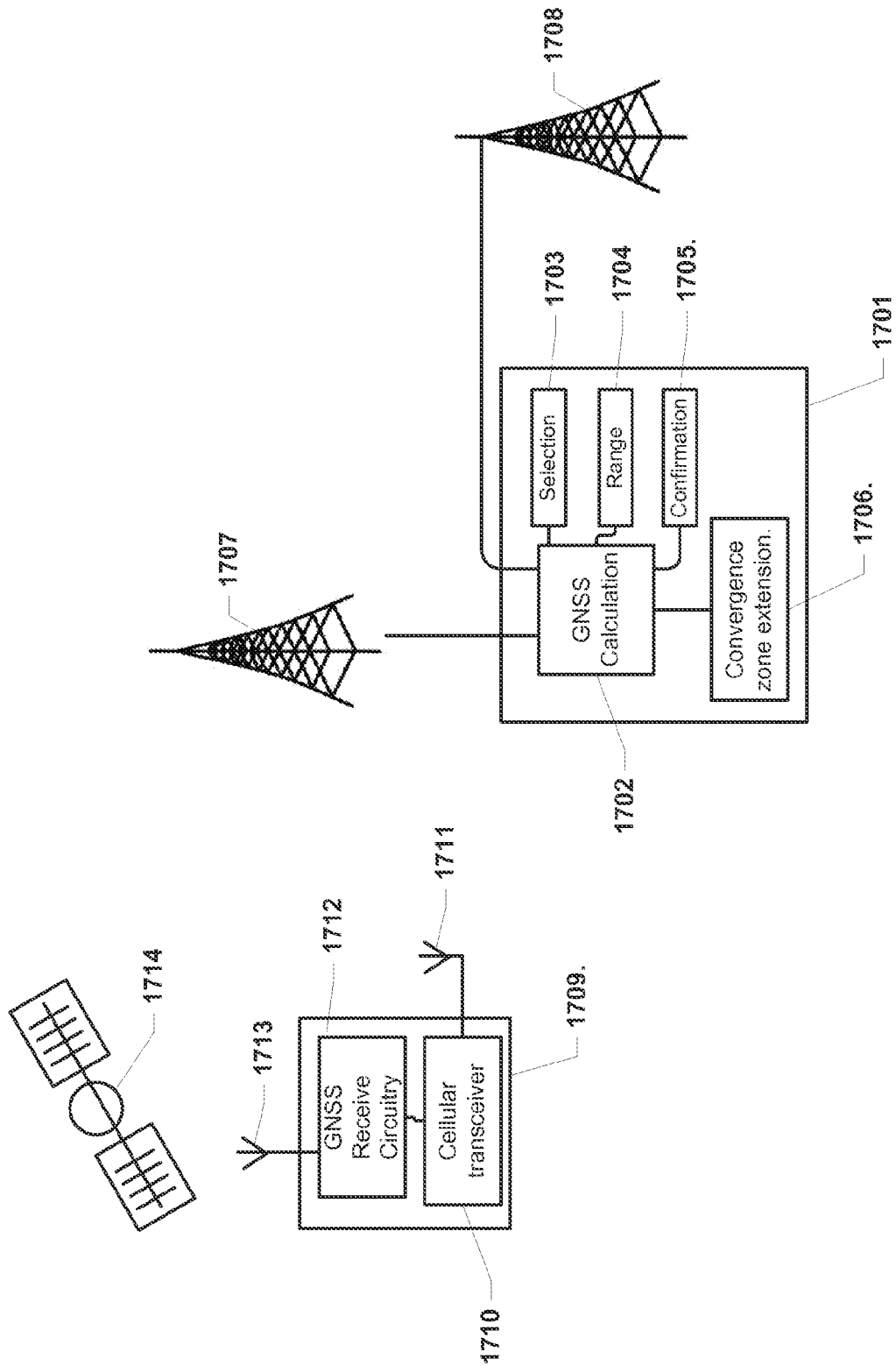
FIG. 17 shows an example of an apparatus for calculating the position of a GPS or GNSS receiver.

An example of an apparatus suitable for implementing the location-determination algorithms described herein is shown generally in FIG. 17. The apparatus is shown generally at 1701. The algorithm may be implemented by a receiver or by a separate piece of apparatus, such as a server. In this example, the apparatus is located in a server that forms part of a cellular network. This is for the purposes of example only, and in other preferred embodiments the apparatus may be a handheld device.

In FIG. 17, a GNSS receiver is shown at 1709. The receiver comprises a GNSS antenna 1713 for receiving signalling events from a satellite 1714. The receiver also comprises GNSS receiver circuitry 1712 that is capable of identifying the times-of-arrival of signalling events transmitted by the satellite. The receiver may comprise a cellular transceiver 1709 and an associated antenna 1711 by means of which the receiver can transmit the measured times-of-arrival to server 1701 for processing. In this example, the server is shown as part of the cellular network and connected to radio tower 1707.

The server location calculation unit 1702 is connected to receive times-of-arrival information from the GNSS receiver via radio tower 1707 and to receive ephemeris information from radio tower 1708, which has a clear view of the sky for receiving GNSS signals from one or more satellites. The location calculation unit is also connected to a selection unit 1703, a range estimation unit 1704, a confirmation unit 1605 and a convergence zone extension unit 1706. The selection unit may be arranged to select the satellite subsets and the reference satellite. The range estimation unit may be arranged to estimate the distances between the receiver and each of the satellites by working out the satellite positions at the current estimate of GPS time. The confirmation unit may be arranged to perform the DoP and other confirmation calculations that check the validity of the updated position and absolute time estimates generated by the algorithm. The convergence zone extension unit may be arranged to determine convergence zones associated with each of the satellites and/or angles of elevation with respect to the receiver for each the satellites. The calculation unit is suitably arranged to maintain overall control of the algorithm by passing data between the various other functional blocks and by performing the actual location calculation. The calculation unit is preferably capable of performing a standard location calculation (linearized or otherwise) in addition to one or more of the single-difference algorithms described above.

Figure 16:
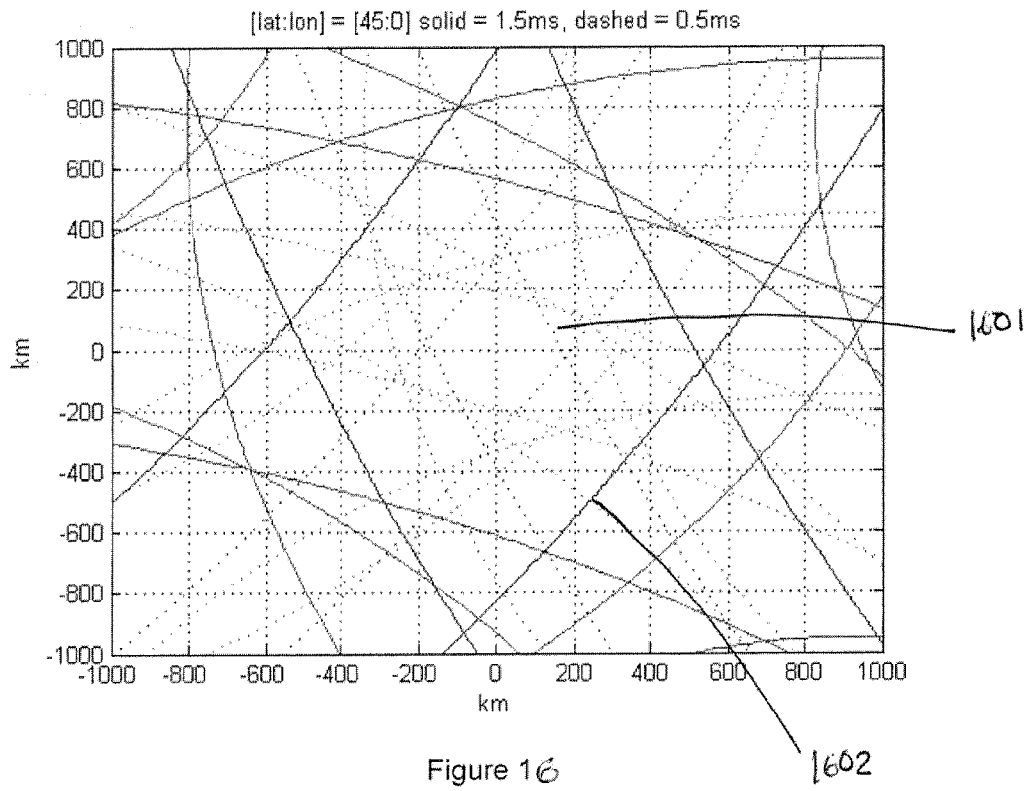
FIG. 16 shows the contour lines of a plurality of convergence zones.

The apparatus shown in FIG. 16 is shown illustratively as comprising a number of interconnected functional blocks. This is for illustrative purposes and is not intended to define a strict division between different parts of hardware on a chip. In practice, the apparatus preferably uses a microprocessor acting under software control for implementing the algorithms described herein. In some embodiments, the algorithms may be performed wholly or partly in hardware. It may, for some examples, be advantageous in some implementations to provide dedicated hardware for performing some of the calculations as is known in the art.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. An apparatus for calculating a position of the apparatus by using a time for periodic signalling events to travel from a plurality of satellites to the apparatus, the apparatus including:

a global navigation satellite system (GNSS) receiver configured to receive one of the periodic signalling events from each satellite, respectively;

a processor configured to:

determine, for each of the plurality of satellites, an initial estimate of a transit time for a periodic signalling event to travel from a respective satellite to the GNSS receiver; and determine, for each of the plurality of satellites, an expected transit time for the periodic signalling event to travel from the respective satellite to the GNSS receiver based on an estimated current position of the GNSS receiver and a predetermined estimate of a position of the respective satellite;

designate one of the plurality of satellites as a reference satellite;

compare the initial estimate of the transit time and the expected transit time for each non-reference satellite with the initial estimate of the transit time and the expected transit time for the reference satellite, respectively, to form respective residuals that are representative of a combined error in the expected transit times; and calculate the position of the GNSS receiver, without calculating an integer part of the initial estimates of the transit times based on the periodic signalling events, using the residuals.

2. The apparatus as claimed in claim 1, wherein the processor is configured to use a time-of-arrival of the periodic signalling event at the GNSS receiver as the initial estimate of the transit time for that signalling event.

3. The apparatus as claimed in claim 1, wherein the processor is configured to use a fractional part of a time-of-arrival of the periodic signalling event at the GNSS receiver as the initial estimate of the transit time for that periodic signalling event, wherein the time-of-arrival includes a fractional portion based on the periodic signalling event and the fractional part is the fractional portion of the period of the periodic signalling event.

4. The apparatus as claimed in claim 1, wherein the processor is configured to compare the initial estimates of the transit times for the reference satellite and each non-reference satellite by measuring a respective time difference between an arrival at the GNSS receiver of the periodic signalling event transmitted by the reference satellite and an arrival at the GNSS receiver of the periodic signalling event transmitted by each of the non-reference satellites.

5. The apparatus as claimed in claim 1, wherein the processor is configured to determine the expected transit times by estimating, for each satellite, a distance between that satellite and the GNSS receiver.

6. The apparatus as claimed in claim 1, wherein the processor is configured to determine the expected transit time for each of the plurality of satellites by:
estimating the position of the GNSS receiver;
estimating the position of a satellite using an estimated absolute time and ephemeris information; and
computing the expected transit time of the satellite using the estimated positions of the GNSS receiver and the satellite.

7. The apparatus as claimed in claim 1, wherein the processor is configured to calculate adjusted transit times by removing, from each initial estimate of the transit time for one periodic signalling event of the periodic signalling events, a clock bias associated with the satellite that transmitted the one periodic signalling event.

8. The apparatus as claimed in claim 7, wherein the processor is configured to represent both the adjusted transit times and the expected transit times in units of one of distance or time, the apparatus being arranged to form the residuals by, for each non-reference satellite:
subtracting the representation of the expected transit time for a non-reference satellite from the representation of the adjusted transit time for the non-reference satellite;
subtracting the representation of the expected transit time for the reference satellite from the representation of the adjusted transit time for the reference satellite;
calculating a difference between the result of the subtraction in respect of the non-reference satellite and the result of the subtraction in respect of the reference satellite.

9. The apparatus as claimed in claim 1, wherein the processor is configured to form each residual by calculating:

$$(\tilde{\tau}_j - \hat{d}_j/c) - (\tilde{\tau}_0 - \hat{d}_0/c)$$

in which:
$\tilde{\tau}_j$ is a fractional part of a time-of-arrival of the periodic signalling event transmitted by a non-reference satellite minus a clock bias associated with the non-reference satellite, wherein $\tilde{\tau}_j$ is the fractional portion of the period of the signalling event of the non-reference satellite;
$\tilde{\tau}_0$ is a fractional part of a time-of-arrival of the periodic signalling event transmitted by the reference satellite minus a clock bias associated with the reference satellite, wherein $\tilde{\tau}_0$ is the fractional portion of the period of the signalling event of the reference satellite;
$\hat{d}_j$ is an estimated distance between the GNSS receiver and the non-reference satellite;
$\hat{d}_0$ is an estimated distance between the GNSS receiver and the reference satellite; and
c is the speed of light.

10. The apparatus as claimed in claim 9, wherein the processor is configured to perform a modulo operation using the periodic signalling event on each residual to calculate the fractional part of that residual, the processor being configured to calculate the position of the GNSS receiver using the calculated fractional parts.

11. The apparatus as claimed in claim 1, wherein each of the plurality of satellites is arranged to transmit respective periodic signalling events at time instants separated by a repetition interval $t_c$, the apparatus is arranged to adjust a range of values of the residuals to a range $t_c/2$ by identifying a sub-$t_c$ part of each residual and, if that result is greater than $t_c/2$, subtracting $t_c$ from that sub-$t_c$ part.

12. The apparatus as claimed in claim 1, wherein the processor is configured to adjust a range of values of the residuals in the range of −0.5 ms to 0.5 ms by identifying a sub-millisecond part of each residual and, if sub-millisecond part is greater than one-half millisecond, subtracting one millisecond from that sub-millisecond part.

13. The apparatus as claimed in claim 12, wherein the processor is configured to represent the range-adjusted residuals in units of distance and calculate the position of the GNSS receiver using those distances.

14. The apparatus as claimed in claim 1, wherein the processor is configured to determine the expected transit time for each of the non-reference satellites by predicting a time-of-arrival at the GNSS receiver of the periodic signalling event transmitted by each non-reference satellite.

15. The apparatus as claimed in claim 14, wherein the processor is configured to form the prediction using a time-of-arrival at the GNSS receiver of the periodic signalling event transmitted by the reference satellite.

16. The apparatus as claimed in claim 14, wherein the periodic signalling events are transmitted at regular intervals by the plurality of satellites and the processor is configured to determine the initial estimates of the transit time for each of the non-reference satellites by:
identifying, at the GNSS receiver, one or more times-of-arrival of periodic signalling events transmitted by a satellite;
forming adjusted times-of-arrival for the periodic signalling events transmitted by the satellite by removing from each periodic signalling event a clock bias associated with that satellite; and
selecting, as the initial estimate of the transit time, the adjusted time-of-arrival time that is closest to the predicted time-of-arrival for that satellite.

17. The apparatus as claimed in claim 1, wherein the processor is configured to:
determine, as the initial estimate of the transit time for the reference satellite, a time-of-arrival at the GNSS receiver of the periodic signalling event transmitted by the reference satellite at a first time according to a clock value associated with the reference satellite; and determine the expected transit time for a non-reference satellite to be a prediction of a time-of-arrival at the GNSS receiver of the periodic signalling event transmitted by the non-reference satellite at the first time according to a clock value associated with the non-reference satellite.

18. The apparatus as claimed in claim 17, wherein the periodic signalling events are transmitted at regular intervals by the plurality of satellites, and the processor is configured to:
determine, as the initial estimate of the transit time for the periodic signalling event transmitted by the reference satellite, the time-of-arrival at the GNSS receiver of the periodic signalling event transmitted by the reference satellite at the first time according to the clock value associated with the reference satellite; and
select, as the initial estimate of the transit time for the non-reference satellite, a time-of-arrival at the GNSS receiver of the periodic signalling event transmitted by the non-reference satellite at the second time, according to the clock value associated with the non-reference satellite, the second time being different from the first time.

19. The apparatus as claimed in claim 18, wherein the processor is configured to select the time-of-arrival of the periodic signalling event transmitted by the non-reference satellite that is within a predetermined time interval of the time-of-arrival at the GNSS receiver of the periodic signalling event transmitted by the reference satellite.

20. The apparatus as claimed in claim 19, wherein the predetermined time interval is less than or equal to one-half the time interval between transmissions of the periodic signalling events by one of the plurality of satellites.

21. The apparatus as claimed in claim 16, wherein the processor is configured to form the residual for a non-reference satellite by performing a subtraction between an adjusted time-of-arrival of a periodic signalling event selected as the determined initial estimate of the transit time of the periodic signalling event and the predicted time-of-arrival for that periodic signalling event.

22. The apparatus as claimed in claim 17, wherein the processor is configured to form the residual for a non-reference satellite by:
forming adjusted times-of-arrival for the periodic signalling events by removing from each time-of-arrival a clock bias associated with the satellite that transmitted that periodic signalling event;
determining a first difference between the adjusted times-of-arrival for the periodic signalling events transmitted by the reference satellite and the non-reference satellite;
determining a second difference between the predicted times-of-arrival for the periodic signalling events transmitted by the reference satellite and the non-reference satellite; and
subtracting one of the first and second differences from the other one of the first and second differences.

23. The apparatus as claimed in claim 18, wherein the processor is configured to predict a time-of-arrival of the periodic signalling event transmitted by the non-reference satellite by summing the time-of-arrival for the periodic signalling event transmitted by the reference satellite with:
a difference between a clock bias associated with the non-reference satellite and a clock bias associated with the reference satellite; and
a time it would take the periodic signalling event to travel the difference between an estimated distance between the GNSS receiver and the non-reference satellite and an estimated distance between the GNSS receiver and the reference satellite.

24. The apparatus as claimed in claim 23, wherein the processor is configured to determine the expected transit time by summing the transit time for the reference satellite with a difference between the first and second times.

25. The apparatus as claimed in claim 18, wherein the processor is configured to determine the position of the GNSS receiver by means of an iterative process, the apparatus being arranged to:
for a first iteration, estimate each distance between the GNSS receiver and the plurality of satellites using known positions of the plurality of satellites at a same predetermined time instant;
for each subsequent iteration, after the first iteration, estimate each distance between the GNSS receiver and the plurality of satellites using the known positions of the plurality of satellites at different predetermined time instants.

26. The apparatus as claimed in claim 25, wherein the processor is configured to, during each subsequent iteration, estimate each distance between the GNSS receiver and the plurality of satellites at respective first and second different predetermined time instants.

27. The apparatus as claimed in claim 1, wherein the processor is configured to determine the position of the GNSS receiver by applying a relative weighting to each of the residuals using a reliability associated with the determined initial estimate of transit time used to compute each respective residual.

28. The apparatus as claimed in claim 1, wherein the processor is configured to calculate a dilution of precision (DOP) parameter using a clock bias associated with the GNSS receiver.

29. The apparatus as claimed in claim 1, wherein the processor is configured to:
determine that the position of the GNSS receiver calculated using the residuals is incorrect;
identify a largest of the residuals and adjust that largest residual by an amount corresponding to a time interval between regular transmissions of periodic signalling events by one of the plurality of satellites; and
recalculate the position of the GNSS receiver using the adjusted residual.

30. The apparatus as claimed in claim 1, wherein the processor is configured to determine, for the plurality of satellites, an average line-of-sight velocity between the GNSS receiver and the plurality of satellites, and to select, as the reference satellite, the satellite having a line-of-sight velocity that is closest to the average line-of-sight velocity.

31. The apparatus as claimed in claim 1, wherein the processor is configured to determine a direction vector corresponding to an average of respective direction vectors from the GNSS receiver to each of the plurality of satellites and to select, as the reference satellite, the satellite of the plurality of satellites for which the direction vector from the GNSS receiver to that satellite is closest to the average direction vector.

32. The apparatus as claimed in claim 1, wherein the processor is configured to select, as the reference satellite, the satellite of the plurality of satellites having either:
a line-of-sight velocity that is closest to an average line-of-sight velocity for the plurality of satellites relative to the GNSS receiver; or a direction vector to the GNSS receiver that is closest to an average direction vector from the plurality of satellites to the GNSS receiver; and using relative magnitudes of an error in an estimate of position of the GNSS receiver and an error in an estimate of the time at which the signals were transmitted from the satellites.

33. The apparatus as claimed in claim 32, wherein the processor is configured to select as the reference satellite the satellite of the plurality of satellites having an optimum combination of line-of-sight velocity and direction vector in relation to the average line-of-sight velocity and the average direction vector.

34. The apparatus as claimed in claim 1, wherein the processor is configured to calculate for a $j^{th}$ satellite of the plurality of satellites a metric, $\Delta_j^2$, that is given by the following equation:

$$\Delta_j^2 = [|R_{MAX}|\underline{a}\cdot(\overline{n}-n_j)]^2 + [|R_{MAX}|\underline{b}\cdot(\overline{n}-n_j)]^2 + \left[|\Delta t_{MAX}|\left|\frac{\partial\overline{\rho}}{\partial t}-\frac{\partial\rho_j}{\partial t}\right|\right]^2$$

in which:
$\overline{n}$ is a mean of the unit vectors between the GNSS receiver and the plurality of satellites;
$n_j$ is the unit vector between the GNSS receiver and the '$j^{th}$' satellite;
$R_{MAX}$ is a maximum error in an original estimate of the position of the GNSS receiver;
$\Delta t_{MAX}$ is a maximum error in an original estimate of a transmission time of a signal from one of the plurality of satellites;

$$\frac{\partial\overline{\rho}}{\partial t}$$

is an average line-of-sight velocity of the plurality of satellites;

$$\frac{\partial\rho_j}{\partial t}$$

is the line-of-signs velocity of the $j^{th}$ satellite;
a and b are orthogonal unit vectors in a tangent plane of the GNSS receiver;
the apparatus being arranged to select as the reference satellite the satellite that when used as the $j^{th}$ satellite generates the smallest metric, where (j∈1 . . . N) and the plurality of satellites includes N satellites.

35. The apparatus as claimed in claim 1, wherein the apparatus is arranged to calculate for each of the plurality of satellites a metric, $\Delta_{j0}^2$, that is given by the following equation:

$$\Delta_{j0}^2 =$$

$$[|R_{MAX}|\underline{a}\cdot(n_j-n_0)]^2 + [|R_{MAX}|\underline{b}\cdot(n_j-n_0)]^2 + \left[|\Delta t_{MAX}|\left|\frac{\partial\rho_j}{\partial t}-\frac{\partial\rho_0}{\partial t}\right|\right]^2$$

in which:
$n_j$ is a unit vector between the GNSS receiver and a $j^{th}$ satellite;

$n_0$ is a unit vector between the GNSS receiver and the satellite that is being tested as the reference;

$$\frac{\partial\rho_0}{\partial t}$$

is a line-of-sight velocity, relative to the GNSS receiver, of the satellite that is being tested as the reference;

$$\frac{\partial\rho_j}{\partial t}$$

is the line-of-sight velocity of the $j^{th}$ satellite;
$R_{MAX}$ is a maximum error in an original estimate of the position of the GNSS receiver;
$\Delta t_{MAX}$ is a maximum error in an original estimate of a transmission time of a signal from one of the plurality of satellites; and
a and b are orthogonal unit vectors in a tangent plane of the GNSS receiver;
the processor being configured to select as the reference satellite the satellite that, when tested as the reference satellite, generates a smallest maximum metric across all N satellites, where (j∈1 . . . N) and the plurality of satellites includes N satellites.

36. The apparatus as claimed in claim 1, wherein the processor is configured to select the reference satellite by:
selecting each of the plurality of satellites in turn as a candidate for being the reference satellite;
for each candidate satellite, forming residuals that are representative of a combined error in the determined expected transit time for the candidate satellite and each of the other satellites;
for each candidate satellite, identifying a maximum of the residuals; and
selecting as the reference satellite the candidate satellite corresponding to a minimum of the maximum residuals.

37. The apparatus as claimed in claim 1, wherein the processor is configured to select a subset of satellites that are visible to the GNSS receiver to be the plurality of satellites from which the position of the GNSS receiver is calculated.

38. The apparatus as claimed in claim 37, wherein the processor is configured to designate one of the subset of satellites as the reference satellite.

39. The apparatus as claimed in claim 34, wherein the processor is configured, during a first iteration, to calculate the position of the GNSS receiver using a first subset of the plurality of satellites comprising a first number of satellites and, during a subsequent iteration following the first iteration, to calculate the position of the GNSS receiver using a second subset of the plurality of satellites comprising a second number of satellites, the second number being higher than the first number.

40. The apparatus as claimed in claim 37, wherein the processor is configured to select the subset of satellites by:
forming a candidate set of satellites that are visible to the GNSS receiver;
successively identifying which of the satellites in the candidate set is associated with a smallest convergence zone and eliminating that satellite from the candidate set until the candidate set consists of a predetermined number of satellites; and
selecting the subset of satellites to comprise the predetermined number of satellites in the candidate set.

41. The apparatus as claimed in claim 37, wherein the processor is configured to select the subset of satellites to consist of a predetermined number of satellites in the set of visible satellites that have the highest levels of elevation relative to the GNSS receiver.

42. The apparatus as claimed in claim 37, wherein the processor is configured to select the subset of satellites to consist of a predetermined number of satellites in the set of visible satellites that have the lowest line-of-sight velocities relative to the GNSS receiver.

43. The apparatus as claimed in claim 1, wherein the processor is configured to calculate the position of the GNSS receiver by testing different integer ambiguities for the determined initial estimates of transit times.

44. An apparatus configured to determine a position of the apparatus, the apparatus including:
- a global navigation satellite system (GNSS receiver configured to receive respective periodic signalling events from a plurality of satellites; and
- a processor configured to:
  - perform a comparison between a fractional part of a time-of-arrival at the GNSS receiver of a periodic signalling event transmitted by a first satellite of the plurality of satellites, a fractional part of a time-of-arrival of a periodic signalling event transmitted by a second satellite of the plurality of satellites, and respective estimated distances between the GNSS receiver and the first and second satellites, and
  - calculate the position of the GNSS receiver using a fractional part of a result of that comparison, wherein:
    - the estimated distances between the GNSS receiver and the first and second satellites are determined from respective times-of-arrival of the periodic signalling events transmitted by the first and second satellites,
    - the fractional parts are fractional parts of the period of the signalling events, and
    - the processor does not determine an integer part of the times-of-arrival of the periodic signalling events when calculating the position of the GNSS receiver.

45. A method for calculating a position of a global navigation satellite system (GNSS) receiver by using a time for periodic signalling events to travel from a plurality of satellites to the GNSS receiver, the method comprising, in respect of each satellite:
- receiving, by the GNSS receiver, one of the periodic signalling events from the satellite;
- determining, by a processor of the GNSS receiver, an initial estimate of transit time for the periodic signalling event to travel from the satellite to the GNSS receiver; and
- determining, by the processor, an expected transit time for the periodic signalling event to travel from the satellite to the GNSS receiver based on an estimated current position of the GNSS receiver and a predetermined estimate of a position of the satellite;

the method further comprising:
- designating, by the processor, one of the plurality of satellites as a reference satellite;
- comparing, by the processor, the initial estimate of the transit time and the expected transit time for each non-reference satellite with the initial estimate of the transit time and the expected transit time for the reference satellite, respectively, to form respective residuals that are representative of a combined error in the expected transit times; and
- calculating, by the processor, the position of the GNSS receiver, without calculating an integer part in the initial estimates of the transit times, using the residuals.

46. A non-transitory computer-readable medium encoded with instructions that when executed by a processor cause the processor to calculate a position of a global navigation satellite system (GNSS) receiver using a time for periodic signalling events to travel from a plurality of satellites to the GNSS receiver, wherein the instructions cause the processor to, in respect of each satellite:
- receive one of the periodic signalling events from the satellite at the GNSS receiver;
- determine an initial estimate of a transit time for the periodic signalling event to travel from the satellite to the GNSS receiver; and
- determine an expected transit time for the periodic signalling event to travel from the satellite to the GNSS receiver based on an estimated current position of the GNSS receiver and a predetermined estimate of a position of the satellite;
- designate one of the plurality of satellites as a reference satellite;
- compare the initial estimate of the transit time and the expected transit time for each non-reference satellite with the initial estimate of the transit time and the expected transit time for the reference satellite, respectively, to form respective residuals that are representative of a combined error in the expected transit times; and
- calculate the position of the GNSS receiver, without calculating an integer part in the initial estimates of the transit times, using the residuals.

* * * * *